(12) United States Patent
Walker

(10) Patent No.: US 12,508,972 B2
(45) Date of Patent: Dec. 30, 2025

(54) KAYAK RACK

(71) Applicant: William Matthew Walker, Gallatin, TN (US)

(72) Inventor: William Matthew Walker, Gallatin, TN (US)

( * ) Notice: Subject to any disclaimer, the term of this patent is extended or adjusted under 35 U.S.C. 154(b) by 302 days.

(21) Appl. No.: 18/146,359

(22) Filed: Dec. 23, 2022

(65) Prior Publication Data
US 2023/0202376 A1 Jun. 29, 2023

Related U.S. Application Data

(60) Provisional application No. 63/293,511, filed on Dec. 23, 2021.

(51) Int. Cl.
*B60R 9/06* (2006.01)
*B60P 3/10* (2006.01)
*B60R 9/08* (2006.01)

(52) U.S. Cl.
CPC .............. *B60P 3/1066* (2013.01); *B60R 9/06* (2013.01); *B60R 9/08* (2013.01)

(58) Field of Classification Search
CPC ............. B60R 9/06; B60R 9/08; B60P 3/1066
USPC ........................................................ 224/405
See application file for complete search history.

(56) References Cited

U.S. PATENT DOCUMENTS

| | | | |
|---|---|---|---|
| 5,544,798 A | 8/1996 | Shumate et al. | |
| 6,457,619 B1 * | 10/2002 | Werner | B60R 9/08 224/497 |
| D497,588 S * | 10/2004 | Wu | D25/64 |
| 6,997,021 B2 * | 2/2006 | Boni | B63B 32/83 70/57 |
| 7,070,196 B1 | 7/2006 | Larsen et al. | |
| 7,331,623 B1 | 2/2008 | Wall et al. | |
| 10,322,662 B2 | 6/2019 | Lasley et al. | |
| D912,605 S * | 3/2021 | Miller | D12/412 |
| 11,046,399 B2 * | 6/2021 | Builder | B63B 32/83 |
| D930,553 S * | 9/2021 | Suckling | D12/412 |
| D1,000,356 S * | 10/2023 | Walker | D12/414 |
| 11,926,469 B2 * | 3/2024 | Grigsby, III | B65D 85/68 |
| 2010/0327033 A1 * | 12/2010 | Payne | B60R 9/058 224/326 |
| 2019/0241414 A1 * | 8/2019 | Willard | B66C 1/22 |
| 2023/0038274 A1 * | 2/2023 | Brand | B62D 33/0207 |

FOREIGN PATENT DOCUMENTS

WO 2013019815 A1 2/2013

* cited by examiner

*Primary Examiner* — Peter N Helvey
(74) *Attorney, Agent, or Firm* — Trendak IP Law LLC; Paul N Dunlap

(57) ABSTRACT

A rack suitable for loading a kayak or other small watercraft onto and off of the bed of a pickup truck, trailer or other vehicle, and into and out of a body of water. The rack has two ladder-like structures, each having two sides, two or more ribs connecting the two sides, and two pipes mounted on the ribs and running lengthwise. Two extension tubes are mountable parallel to each other to extend the two pipes away from the rack. Other features that may be part of a rack system include a winch, tie-downs, extension rods with pulleys, padded braces, support rods which may have rollers, and the like.

23 Claims, 25 Drawing Sheets

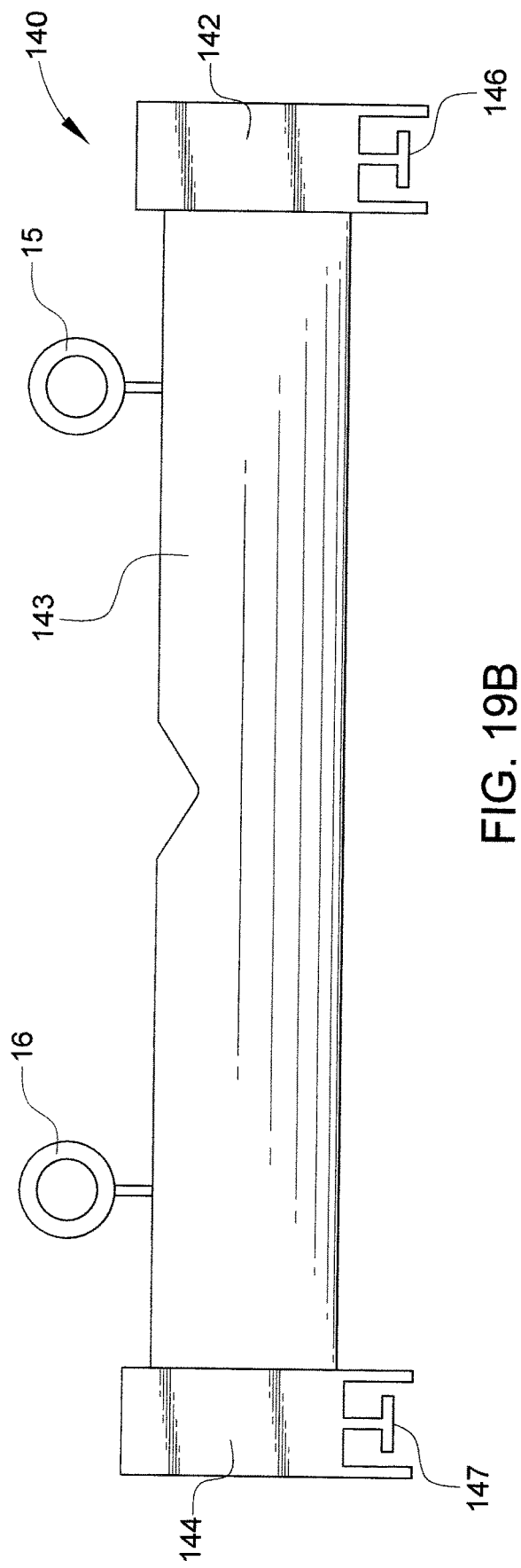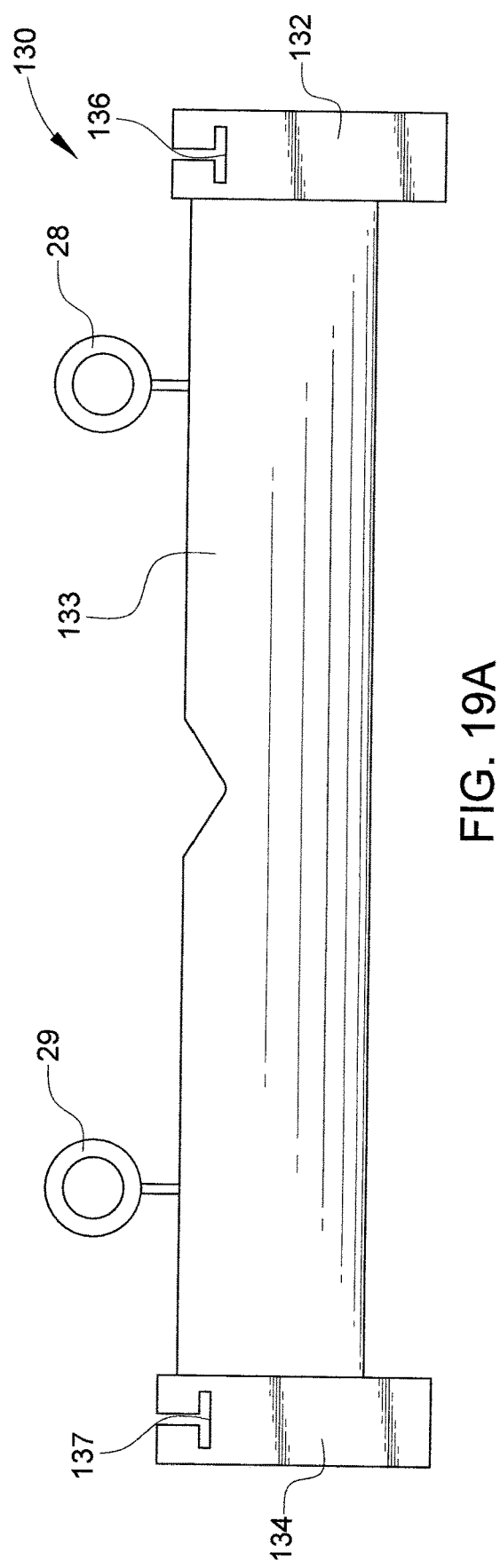
FIG. 19B
FIG. 19A

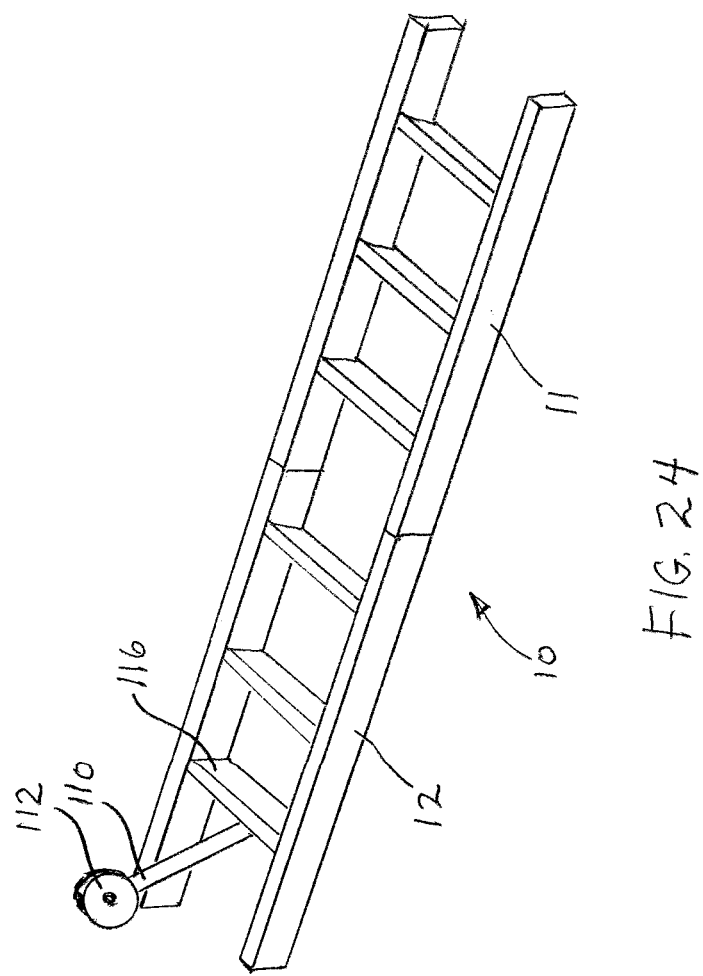

US 12,508,972 B2

KAYAK RACK

REFERENCE TO RELATED APPLICATIONS

This application claims priority from U.S. provisional application No. 63/293,511 filed Dec. 23, 2021, and reference is made to U.S. application Ser. No. 29/819,693 filed Dec. 16, 2021, the entire contents of both of which are hereby incorporated herein by reference.

FIELD OF THE INVENTION

The present invention relates to accessory racks and carriers. More specifically, the present invention is a kayak rack apparatus used to load and hold a kayak onto the rear end of a vehicle.

BACKGROUND OF THE INVENTION

Kayaking has been gradually growing in popularity as a hobby or an activity to enjoy outdoors. When it comes to kayaking, a person needs to have access to a kayak or the like. Renting is a cheap alternative option versus owning a kayak though the cost of renting can add up to a substantial amount if done continuously. In this case, it is much more cost efficient to own a kayak. Kayaks come in many different forms, shapes, and sizes. Therefore, the weight of one kayak to another can vary substantially. For kayak owners, it is essential to have an apparatus that can be used to properly transport the kayak from one location to another location. Due to the variety of different kayaks, there are different methods and apparatuses that are used to assist with the management and the transportation of a kayak. Furthermore, during the process of handling a kayak, it is important that the kayak and the apparatus used to hold and transport the kayak is not damaged.

SUMMARY OF THE INVENTION

An objective of the present invention is to provide an apparatus used to hold and secure a kayak on the rear end of a vehicle such as a truck. The present invention provides an apparatus utilized to assist in the handling and the loading and unloading of a kayak or canoe onto and off of the rear end of a vehicle. Furthermore, the present invention is an apparatus that reduces potential damage to the kayak and the rear end of a vehicle during the process of handling a kayak.

BRIEF DESCRIPTION OF THE DRAWINGS

All illustrations of the drawings are for the purpose of describing selected versions of the present invention and are not intended to limit the scope of the present invention.

FIG. 19A and 19B is an illustration of one embodiment of the fastening track mechanism of the first ladder and the second ladder.
FIG. 24 is another illustration of an extension rod with pulley of the present invention.

DETAILED DESCRIPTION OF THE INVENTION

Figure 1:
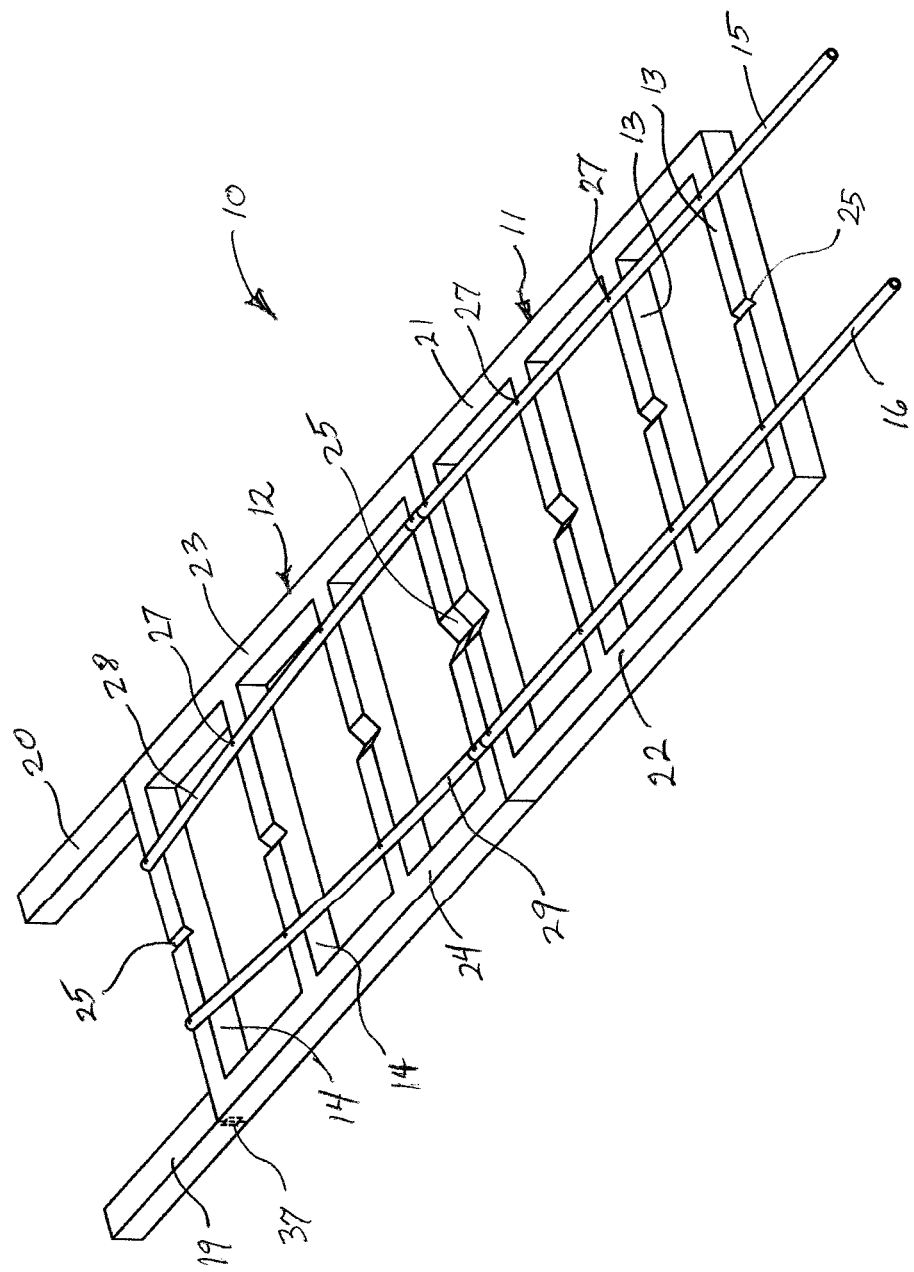
FIG. 1 is a top perspective view of the present invention.

The present invention provides an apparatus used to hold and secure a kayak, canoe, or other small watercraft on the rear end of a vehicle such as a truck. Herein, the term kayak rack will be used inclusively. The kayak rack also can assist in the handling and the loading and unloading of a small watercraft onto and off the rear end of a vehicle. Furthermore, the present invention is an apparatus that reduces potential damage to the kayak and the rear end of a vehicle during the process of handling a kayak.

A first embodiment of the invention is shown in FIGS. 1-11. The kayak rack 10 comprises a first ladder 11, a second ladder 12, a set of ribs 13, 14, a set of cylindrical pipes 15, 16, a set of hinges 17, 18, and a pair of pillars 19, 20. The ladders 11, 12 form the base of the rack 10.

Figure 2:
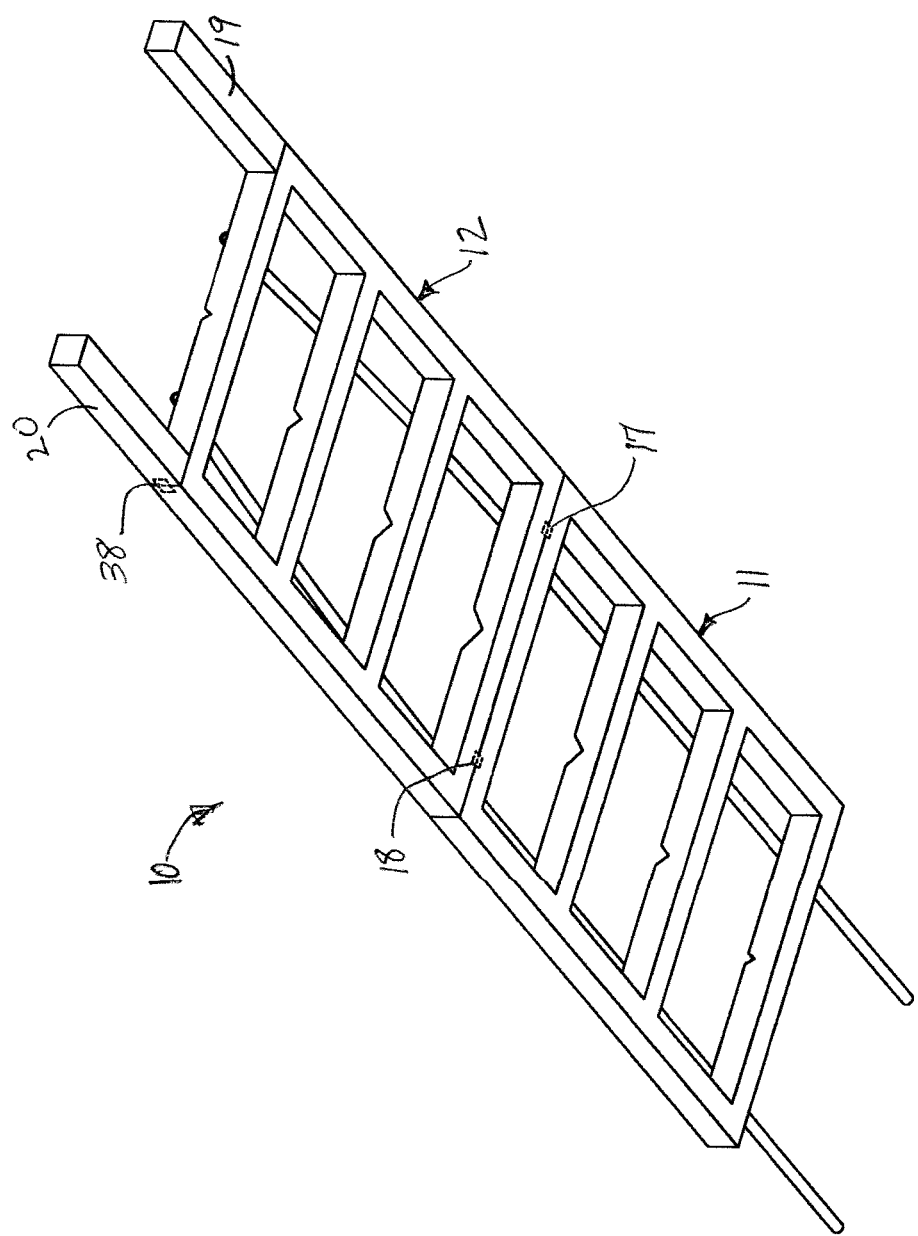
FIG. 2 is a bottom perspective view of the present invention.
Figure 3:
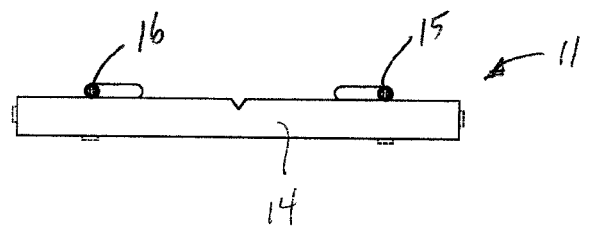
FIG. 3 is a front view of the present invention.
Figure 4:
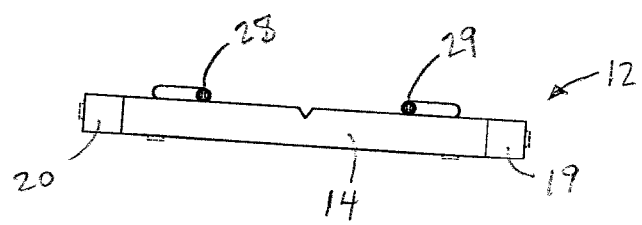
FIG. 4 is a rear view of the present invention.
Figure 8:
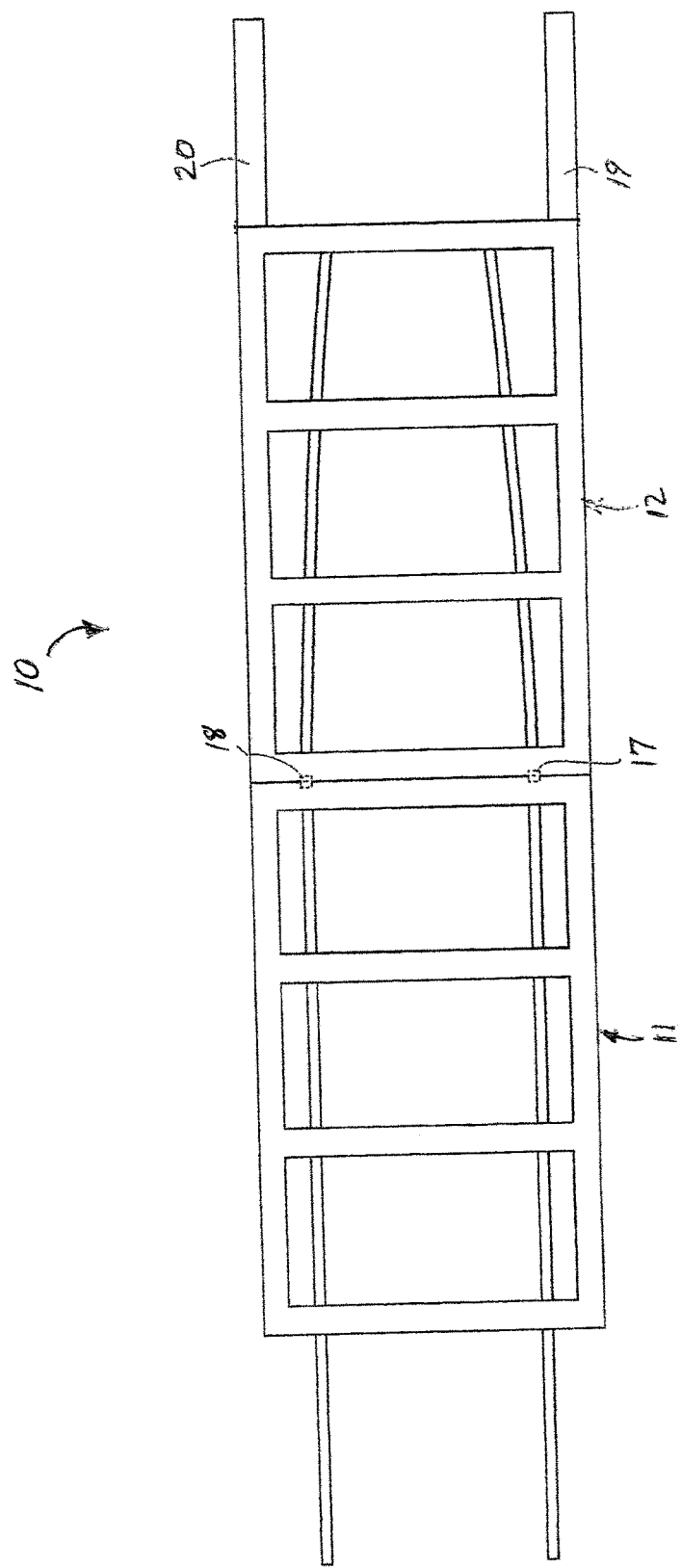
FIG. 8 is a bottom view of the present invention.
Figure 5:
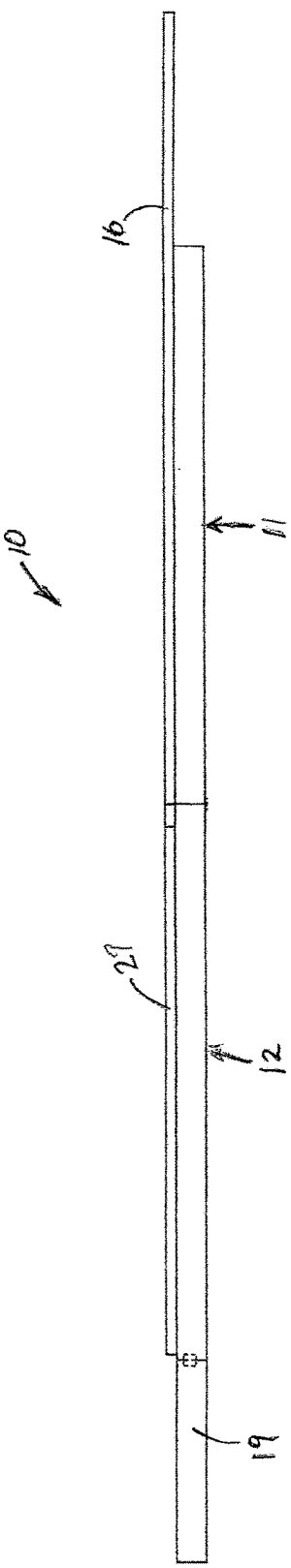
FIG. 5 is a right-side view of the present invention.
Figure 7:
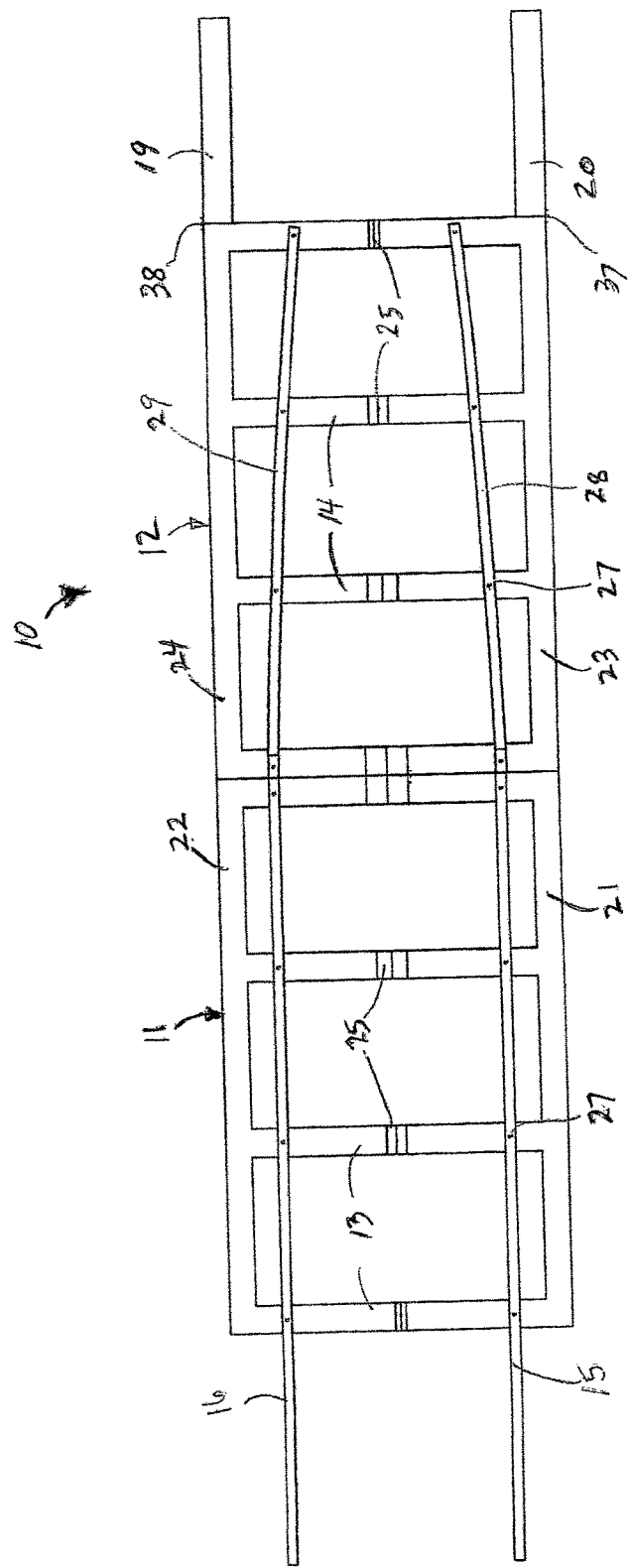
FIG. 7 is a top view of the present invention.
Figure 6:
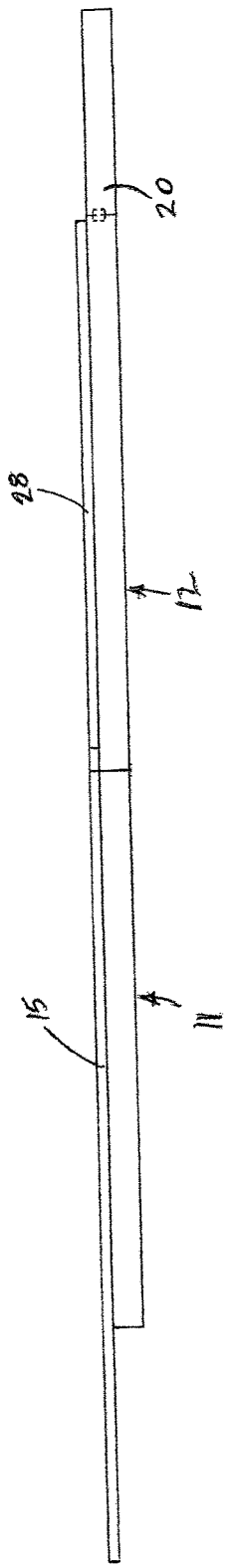
FIG. 6 is a left-side view of the present invention.
Figure 11:
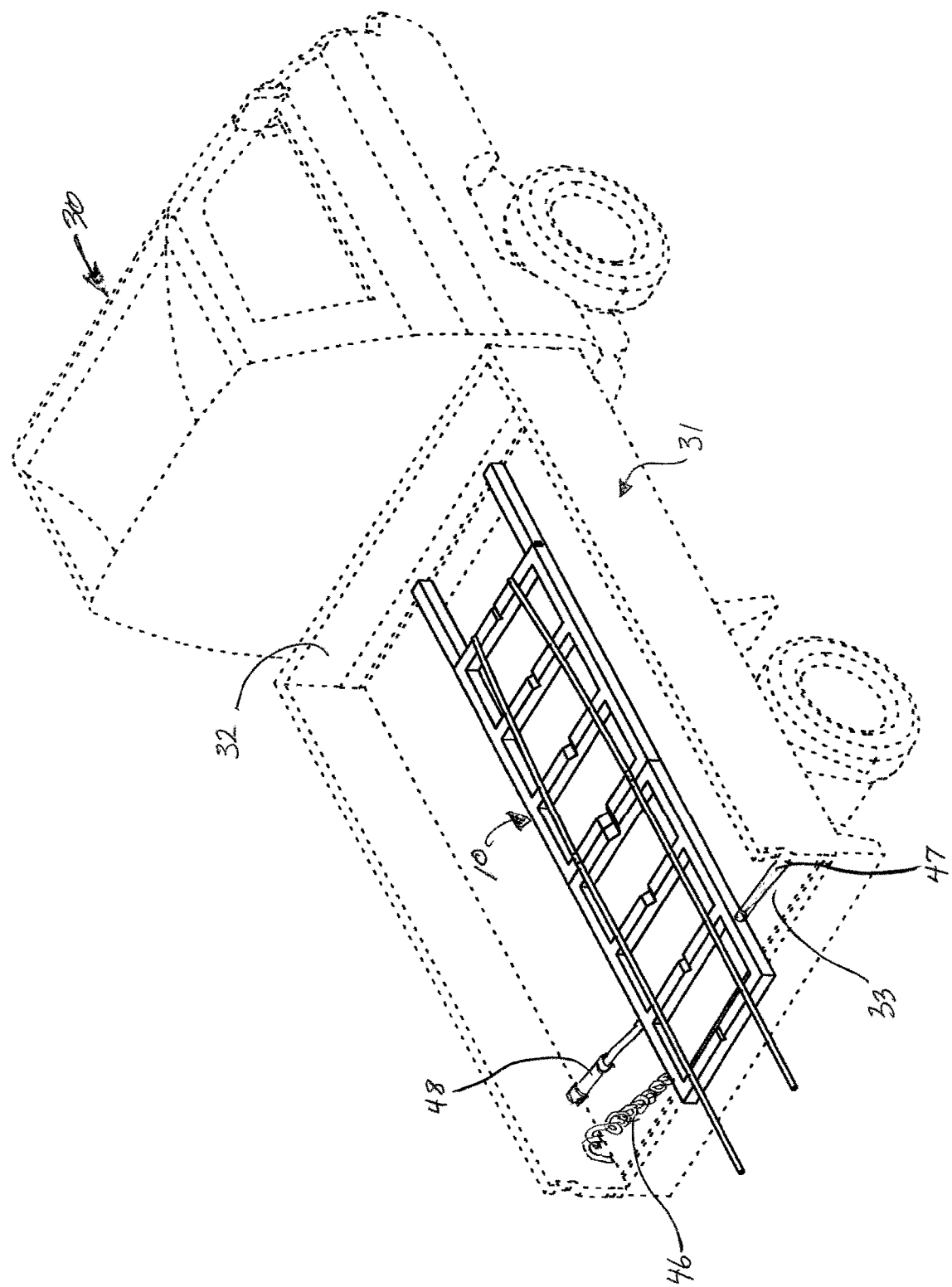
FIG. 11 is an illustration of the present invention mounted on a rear bed of a vehicle.

The first ladder 11 is the rear portion of the kayak rack as can be seen in FIGS. 1, 2 and 11. Front or forward and rear or backward are used herein with respect to front and rear of a vehicle on which the rack may be mounted. The first ladder 11 takes shape and structure similar to a ladder with two sides 21, 22 and a set of ribs 13 connecting the two sides.

The set of ribs are perpendicular to the two sides of the first ladder and are the connection between the two sides. The set of ribs 13 further comprises triangular or other-shaped crevices 25. Each rib 13 of the first ladder 11 comprises a single crevice 25. The crevices 25 are indentations of the top surface of the set of ribs 13 as can be seen in FIG. 1. The crevices 25 may be used as a support and rack for a kayak or the like and may be shaped to fit around the keel of a kayak or canoe. The first ladder 11 further comprises a set of cylindrical pipes 15, 16. The set of cylindrical pipes 15, 16 are fastened to the set of ribs 13 of the first ladder 11 by means of pins, nails, screws, or the like. Any such fastener 27 can be used to fasten the set of cylindrical pipes 15, 16 to the set of ribs 13. The set of cylindrical pipes are utilized as a support and rack for a kayak or the like.

The second ladder 12 is the front portion of the kayak rack as can be seen in FIGS. 1 and 2. The second ladder 12 takes shape and structure similar to a ladder with two sides 23,24 and a set of ribs 14 connecting the two sides 23, 24. The set of ribs 14 are perpendicular to the two sides 23,24 of the second ladder and are the connection between the two sides 23, 24. The set of ribs 14 further comprises triangular crevices 25. Each rib 14 of the second ladder 12 comprises a single triangular or other-shaped crevice 25. The crevices 25 are indentations of the top surface of the set of ribs 14 as can be seen in FIG. 1. The crevices 25 may be used as a support and rack for a kayak or the like. The second ladder further comprises a set of cylindrical tubes 28, 29. The set of cylindrical tubes 28, 29 are fastened to the set of ribs 14 of the second ladder 12 by means of pins, nails, screws, or the like. Any fastener 27 can be used to fasten the set of cylindrical pipes 28, 29 to the set of ribs 14. The set of cylindrical pipes are utilized as a support and rack for a kayak or the like.

On both ladders, the cylindrical pipes may be curved or bowed (i.e., lengthwise curvature) to better fit and support the shape of the kayak or canoe to be carried. The cylindrical pipes are the primary supports on which the watercraft rests.

The pair of pillars 19, 20 are pole-like structures used to assist with the overall mounting of the kayak rack onto floor 33 or the rear bed 31 of a vehicle such as a truck 30 as can be seen in FIG. 11. The pair of pillars 19, 20 are located on the front portion of the second ladder 12. The pair of pillars 19, 20 are extended forward on the two sides 23, 24 of the second ladder 12. The pillars 19, 20 thus function as spacers to keep the two ladders 11, 12 a predetermined distance from the forward wall 32 of the truck bed 31, and they make it impossible for the rack to slide forward or out from under the kayak. Some embodiments may not require the pillars, especially if the primary apparatus that secures the rack itself in the truck bed is located towards the middle of the rack and in the vicinity of the tailgate. The pillars could be attached by means other than hinges or be different shapes from the main ladders. There could also be a means to secure the pillars both in the deployed and retracted position, such as a latch, a strap, a bungee connected to hooks on each one, or the like.

Figure 9:
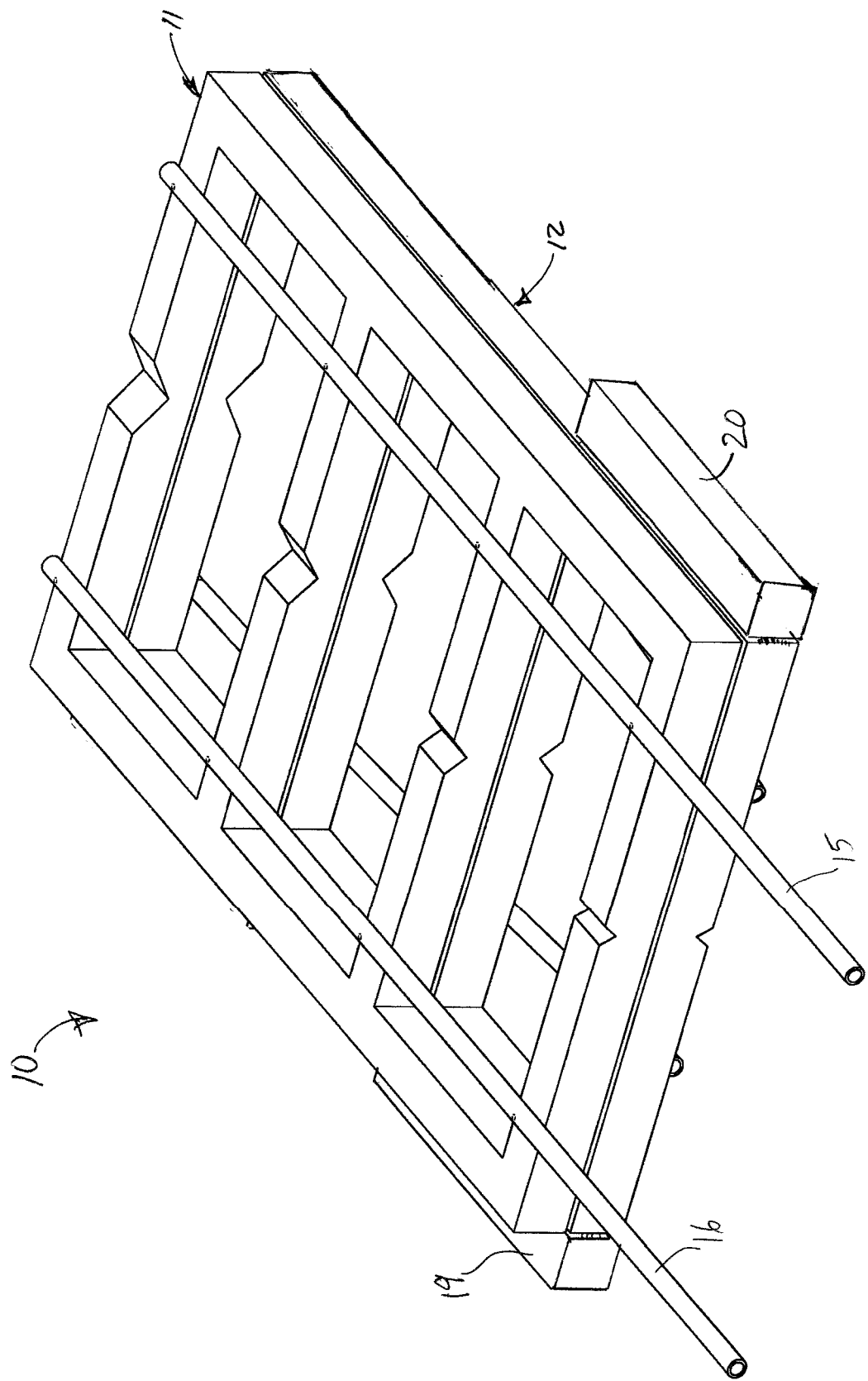
FIG. 9 is a top perspective view of the present invention in a collapsed configuration.
Figure 10:
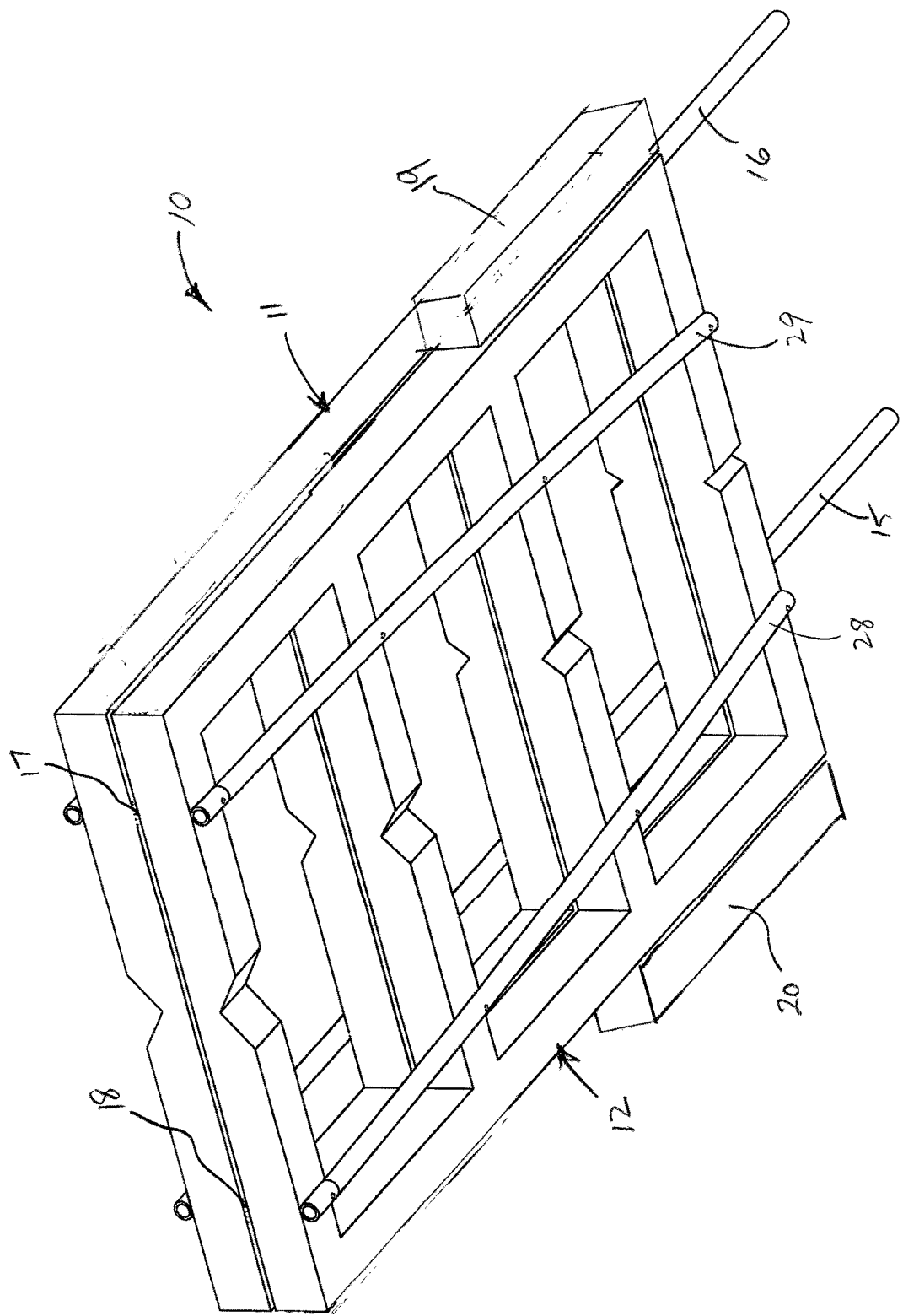
FIG. 10 is a bottom perspective view of the present invention in a collapsed configuration.

The set of hinges 17, 18, 37, 38 are representative of various fastening mechanisms for the kayak rack. The set of hinges can be replaced by any mechanism or device that mimics the utility of a hinge by connecting two components together, but which allows them to swing and rotate with respect to each other or to be separated easily for more compact storage. The present invention may comprise four hinges. The first hinge 37 and the second hinge 38 are used to connect the two pillars 19, 20 to the forward portion of the second ladder 12. The third hinge 17 and the fourth hinge 18 are used to connect the first ladder 11 and the second ladder 12 together in end-to-end fashion. As can be seen in FIGS. 9 and 10, the kayak rack may be folded into a collapsed configuration with one ladder on top of the other ladder. In contrast to FIGS. 9 and 10, FIGS. 1 through 8 are showing the present invention in a deployed configuration. In addition, FIG. 11 is an illustration of the present invention deployed on a rear bed 31 of a vehicle 30. Some embodiments may not require hinges. Other means of removably attaching the parts may be used, but preferably the rack should be collapsible for easier transport and storage when not in use with a kayak.

Figure 12:
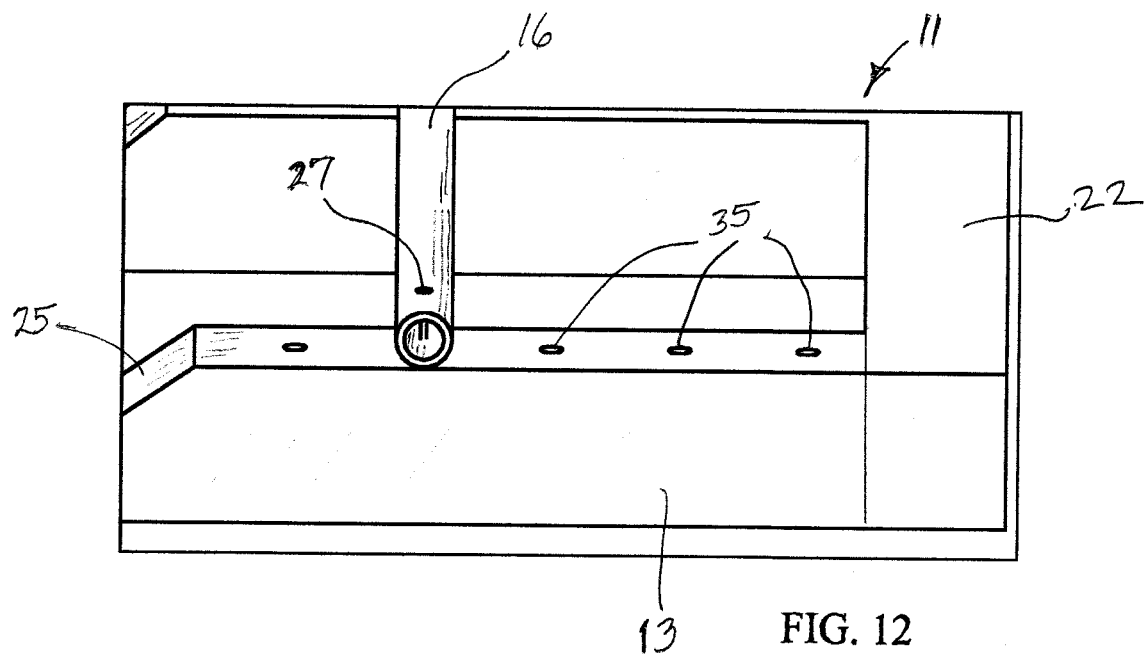
FIG. 12 is a magnified, partially fragmented view showing the adjustable mechanism of one embodiment of the present invention.

In reference to FIG. 12, an illustration of one embodiment of the present invention is shown. In an embodiment of the present invention, the cylindrical pipes 15, 16, 28, 29 that are fastened on the top of the first ladder 11 and the top of the second ladder 12 can be deformable or adjustable. Some or all of the ribs of the first ladder and the second ladder have extra holes 35 or other forms of attachment points that are utilized for the adjustable functionality of the cylindrical pipes. The purpose of this is to better accommodate the particular contours, widths, and lengths of the various kayaks or canoes that could be used. Thus, the attachment points on the ribs can be chosen in a way to produce curvature or bowing of the cylindrical pipes to fit the shape of different watercraft. The cylindrical pipes may have holes that are designed for a protruding fastening device such as a pin, nail, screw, bolt, etc. to set or affix the cylindrical pipes in the desired position on ladders 11, 12. Furthermore, the cylindrical pipes may have padding material (not shown) over them to provide a soft and secure surface for the kayak. Any suitable padding may be used, including for example, carpet, foam, plastic, rubber, and the like.

Figure 13:
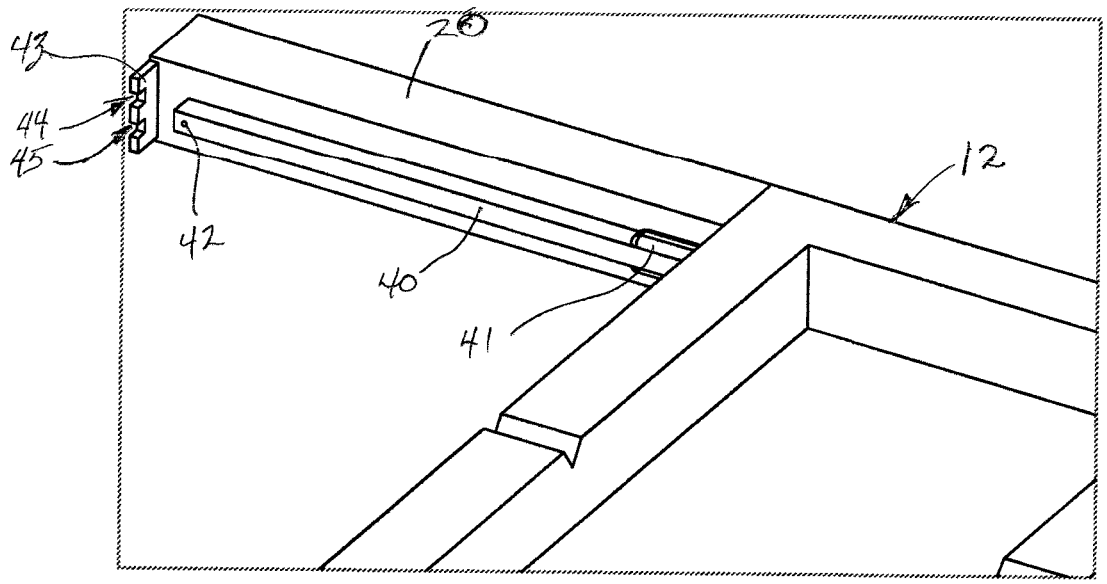
FIG. 13 is a magnified, partially fragmented view showing one embodiment of the present invention with the padded bracket collapsed.
Figure 14:
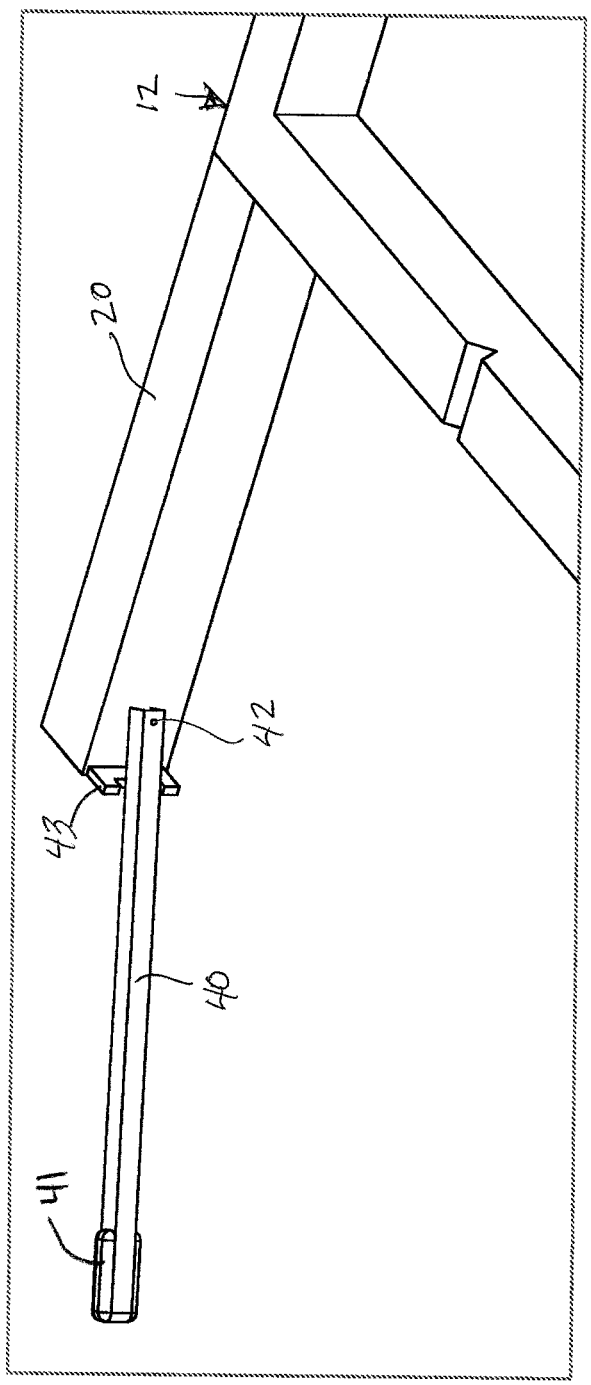
FIG. 14 is a magnified, partially fragmented view showing one embodiment of the present invention with the padded bracket deployed.

In reference to FIGS. 13 and 14, an illustration of an optional feature of the present invention is shown. On the kayak rack, there may be padded brackets 40 with padding 41 attached to the set of pillars 19, 20 on the front area of the second ladder 12. The padded brackets 40 may be utilized as a mechanism to assist in stabilizing a kayak on the rack by fitting against either side of the kayak. The padded brackets 40 are elongated pole-like structures that may rotate on pivot 42 and extend upwards and/or outwards as can be seen in FIGS. 13 and 14. Furthermore, the jagged edge of fitting 43 on the set of pillars 19, 20 may be utilized for angling and setting the padded brackets 40 in their desired position. The padded brackets 40 may thus nest or snug tightly within one or more notches 44, 45 of the jagged edge of fitting 43 as can be seen in FIGS. 13 and 14. In some embodiments the padded brackets may be located on the winch plate, or on the first ladder 11, or on the second ladder 12 and may serve to stabilize or guide the kayak onto the rack when loading.

Figure 15:
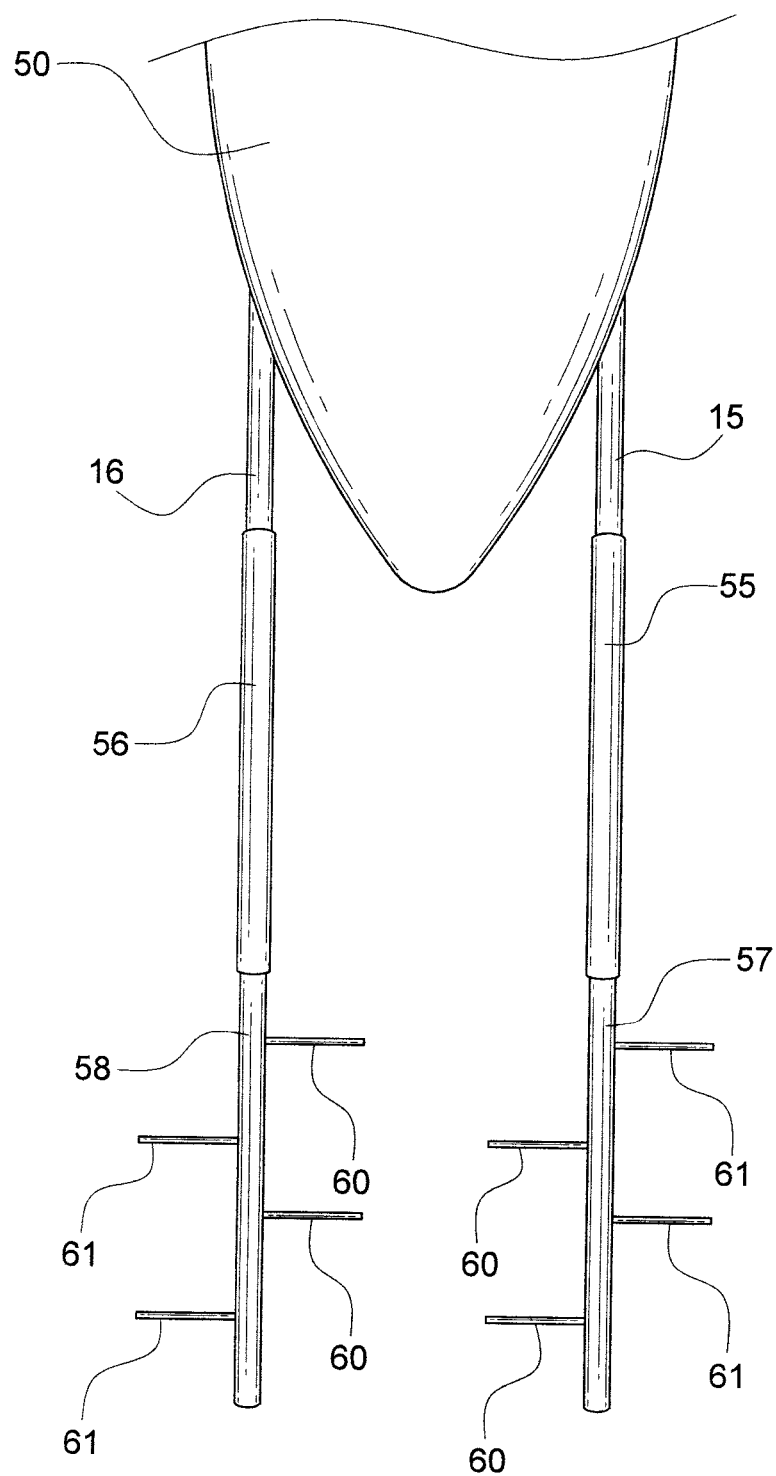
FIG. 15 is an illustration of the extendable tubes and support rods of the present invention.
Figure 16:
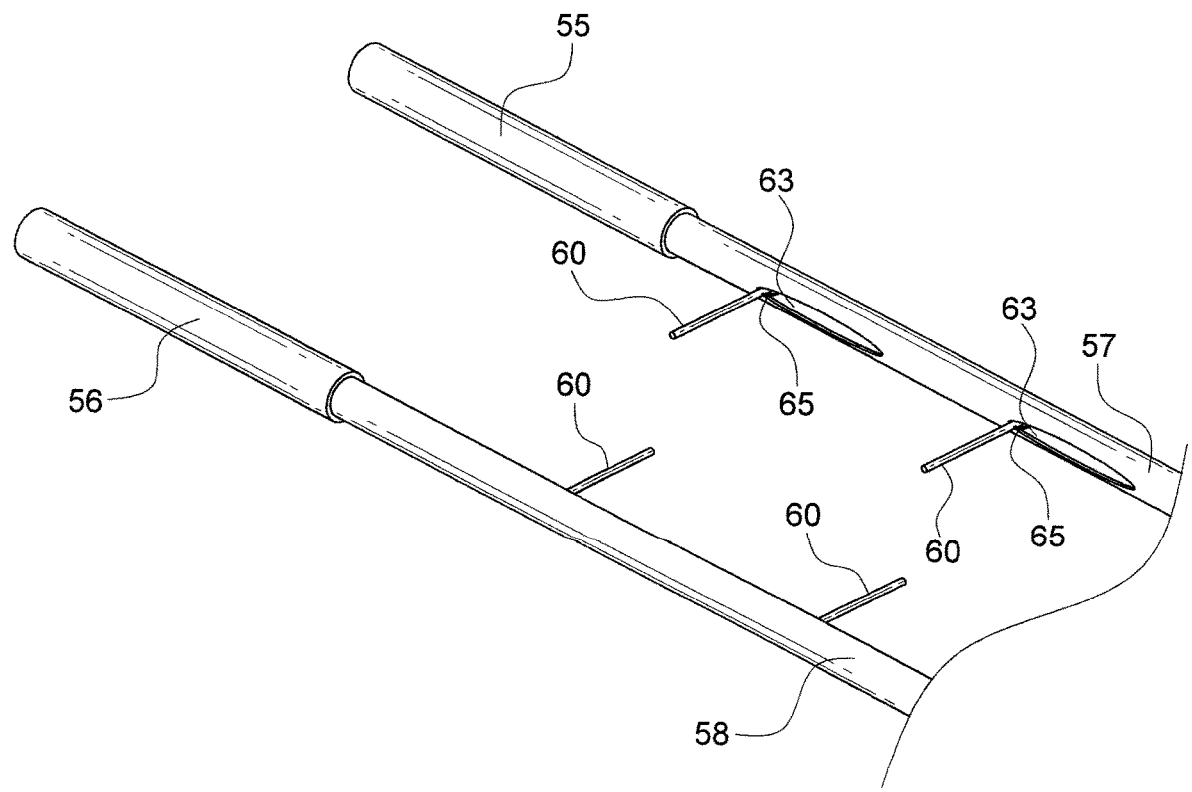
FIG. 16 is a partially fragmented illustration of the extendable tubes and support rods of the present invention.
Figure 17:
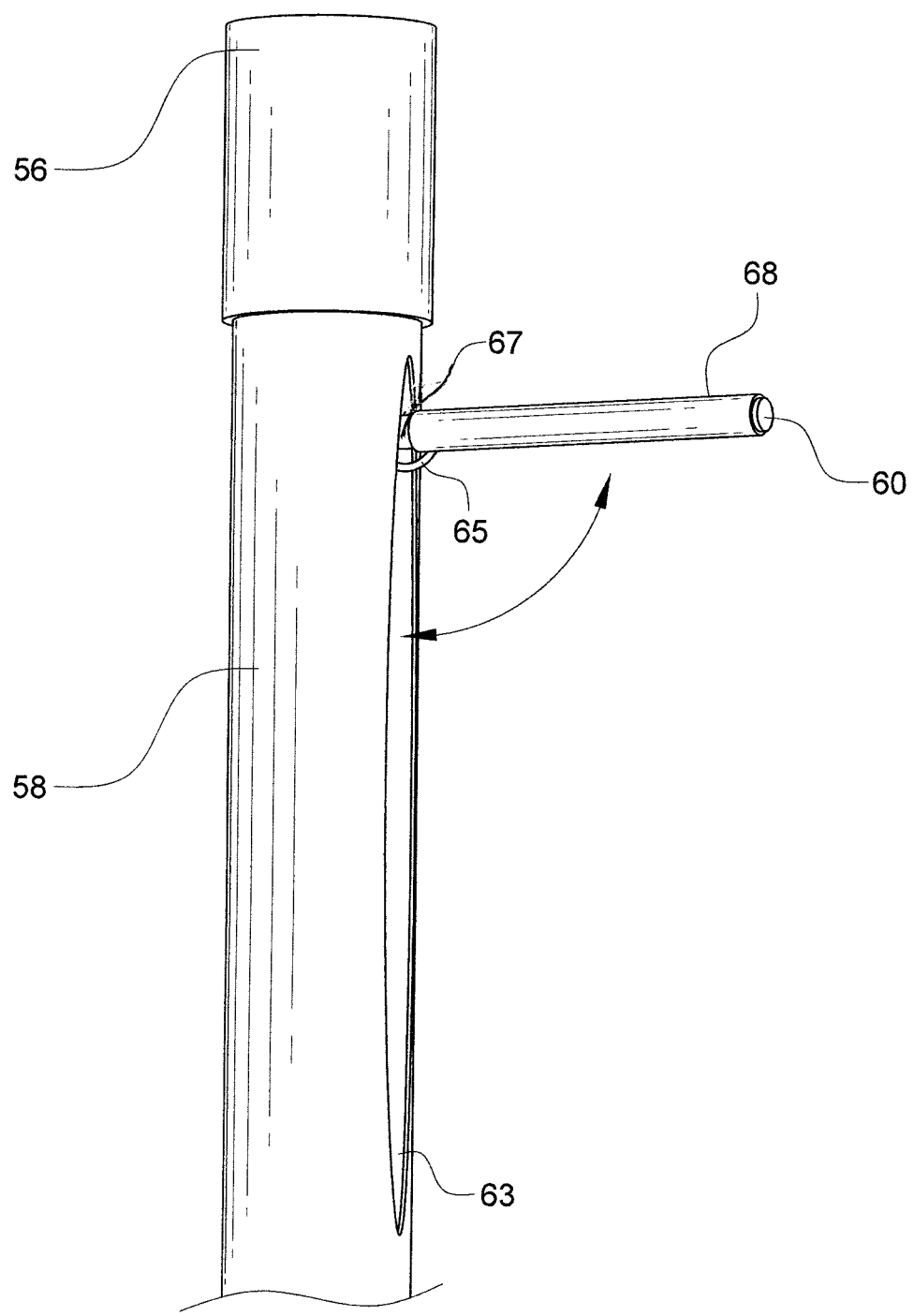
FIG. 17 is a partially fragmented illustration of the extendable tubes and support rods of the present invention.
Figure 18A:
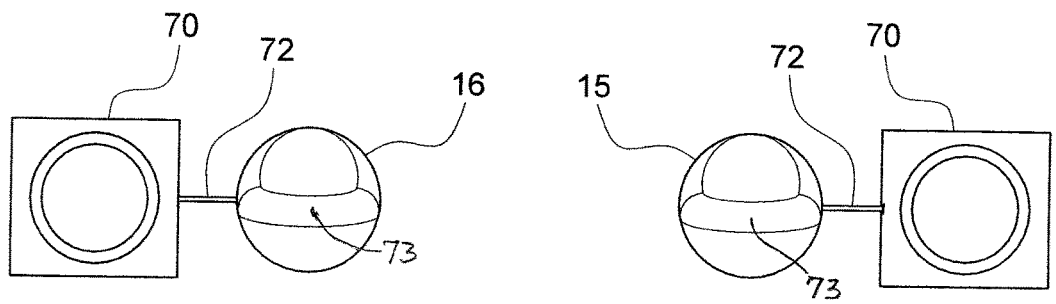
FIG. 18A, 18B, 18C, and 18D illustrate one embodiment of the cylindrical ports according to the present invention.
Figure 18B:
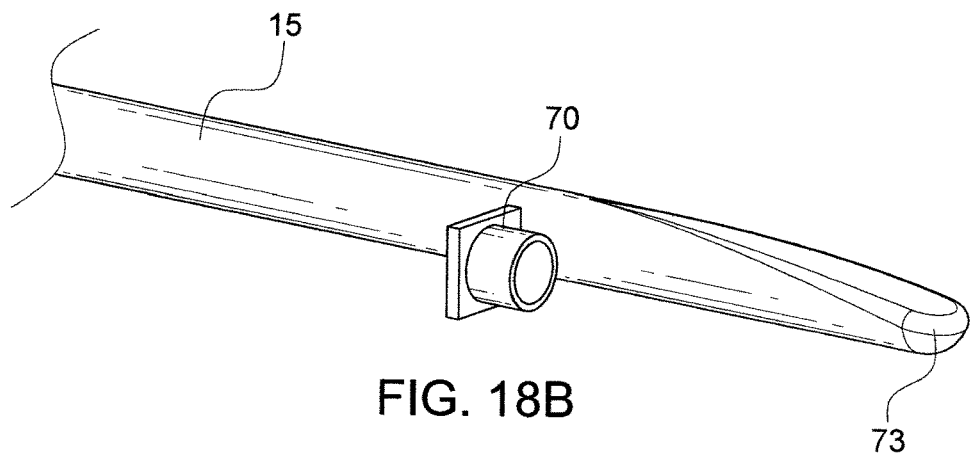
Figure 18C:
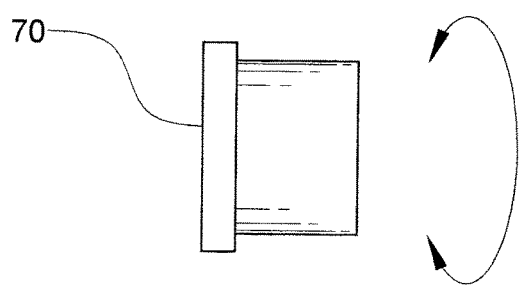
Figure 18D:
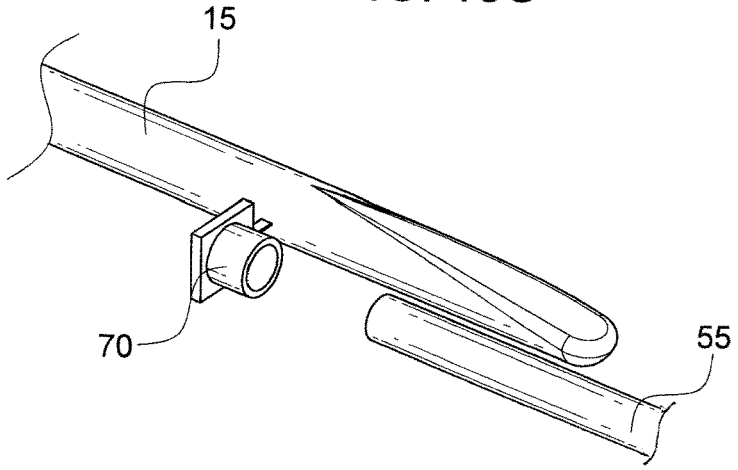

In reference to FIGS. 15, 16, and 17, an illustration of another aspect of the present invention is shown. The kayak rack as shown includes extension tubes 55-58, which are shown having multiple sections and being extendable. The extendable tubes 55-58 are used to assist in the loading and unloading process of a kayak or the like onto the kayak rack and essentially act as a ramp. The extendable tubes 55-58 may be elongated, telescoping pipes that are able to extend rearward from the cylindrical pipes 15, 16 or from another location on the rack 10. The extendable tubes 55-58 can collapse down to a length that permits them to fit on or within the confines of the rack 10. The extendable tubes 57, 58 may further comprise support rods 60, 61 that may further assist in the loading, unloading, and holding of a load such as a kayak onto the rack. The support rods 60, 61 could be located within the extendable tubes 57, 58 and may be spring loaded (see spring 65) so that they will pop out and deploy whenever the given portion of the extendable tubes 57, 58 in which they are located is extended and exposed. The support rods 60, 61 would pop out of a similar-shaped cavity 63 cut in the pipe 57, 58. The support rods 60 may be positioned within the extendable tubes 58 as can be seen in FIG. 17. The extendable tubes 57, 58 may comprise cavities that house the support rods. The cavities 63 for the support rods are structured and shaped to mimic the support rod but slightly bigger in order to house the support rods. The support rods 60, 61 are parallel to the extendable tubes 57, 58 when in a collapsed configuration and contained within the corresponding cavity 63. The support rods 60, 61 are perpendicular to the extension tube when in a deployed configuration as can be seen in FIGS. 15 and 16. In one embodiment, one or more of the support rods 60 may each comprise a roller or cylindrical tube structure 68. The roller or cylindrical tube structure 68 may spin or rotate around a solid rod or axle 67 to better facilitate the kayak or canoe traversing over them when on the extension tubes.

The cylindrical pipes and extension tubes have been described as tube structures. The cylindrical pipes and extension tubes are the main support structures of the rack for holding and loading a kayak. The structure of the cylindrical pipes and extension tubes can be of any structure and are not intended to be limited to cylindrical or round tubes. For example, the cylindrical pipes and extendable tubes can instead be square tubes or rectangular tubes or rails. Regardless of the shape or form of the extension tubes 57, 58, the ends that extend into the water may advantageously be attached together by some means to prevent them from spreading apart as a kayak is loaded and unloaded. Additional means to prevent spreading and maintain them in parallel relation could be added at other positions along the extension tubes 57, 58 as needed. Such means of attaching the two extension tubes together may include straps, cords, bungees, or a rigid brace structure or the like. The cylindrical pipes and extension tubes preferably can be in sections that may be removably connected or attached together in one or more places so they can assemble easily, be extendable, and collapse for easy storage. Positive flotation materials may be used on each of the extension tubes. Such floats work well when placed on the ends of the tubes in the water when you launch the watercraft. The floats may be removable or adjustable, i.e., moved up the tubes toward the tailgate. It has been found that when loading, the floats may impede the kayak from coming up the tubes. Also, when the ends of the tubes are free of the floats, the ends may sink down to the bottom and dig in once the weight of the kayak hits them, which may help to hold them stationary during loading.

There are a couple of different options regarding where and how the pipes and tubes could attach for storage and to be deployed for loading and unloading a kayak. The extension tubes could attach for storage to clips or storage holders somewhere on the rack. The extendable extension tubes 55-58 could be deployed by attaching to the rear of the cylindrical pipes 15, 16 on either side of the rack upon which the kayak rests during transport. The cylindrical pipes 15, 16 on the rear of the rack could be the female end of this connection and the extendable tube's ends would be a smaller diameter allowing them to fit into the pipes on the rear of the rack, or vice versa. A snug fit alone could be sufficient to connect the tubes and use the resulting ramp as designed, or threaded connections, fittings, couplings, universal joints, wire lock pin, cotter pin, or a linchpin or something similar could be used to secure this attachment.

Furthermore, the extension tubes 55, 56 could attach to the rear of the cylindrical pipes 15, 16 via two ports 70 attached to the sides of the cylindrical pipes 15, 16 on the rack, at or near their ends 73 as shown in FIG. 18A-18D. These ports 70 would attach to the pipes 15, 16 in such a way that would allow the ports to rotate or swivel up and down freely to adjust for varying angles at which the tubes may be when deployed, for example, by means of swivel connecting rod 72. The ports 70 could serve as either the male or female end of the coupling for the extendable tubes 55, 56. In one embodiment, ports 70 could be switched to either side of the cylindrical pipes 15, 16 as necessary, depending on the width of the kayak/canoe being used. Another important point of emphasis for the forementioned embodiment is that with the ports 70, the ends 73 of the pipes 15, 16 attached to the rack could be made rounded or pointed in order to better accommodate a kayak coming up the extension tubes attached to the ports at an angle. This design may mitigate the interference of the kayak sliding onto the rack at the junction of the extension tubes and the pipes at the rear of the rack. Note that the ends and connections of the pipes and tubes may be either male or female ends as needed to provide flexibility of design.

In reference to FIGS. 15, 16, and 17, the support rods 60, 61 of the extendable tubes are illustrated. The rods 60, 61 could retract automatically when the smaller tube in which they are located is pushed into the larger diameter tube. As the smaller tube 57 or 58 is pushed into the larger tube 55 or 56 respectively, when the deployed rod 60 meets the entrance edge/perimeter of the larger tube 55 or 56, and as the smaller tube 57 or 58 is continually pushed, the rod 60, 61 is pushed down into the cavity 63 that houses it. As the smaller tube 57, 58 continues to be pushed into the larger tube 55, 56, any remaining rods 60, 61 are retracted in like manner. The support rods 60, 61 may be placed at varying distances apart. One possible embodiment would utilize rods 60 that deploy in between the two extendable tubes 55-58 to prevent the kayak from dropping in between them, while another embodiment could utilize rods 61 that deploy outward from the tubes to keep the kayak from slipping off the side of the extendable tubes. Rods 60, 61 may both be deployed between the extension tubes and outwardly from the extension tubes.

Figure 20:
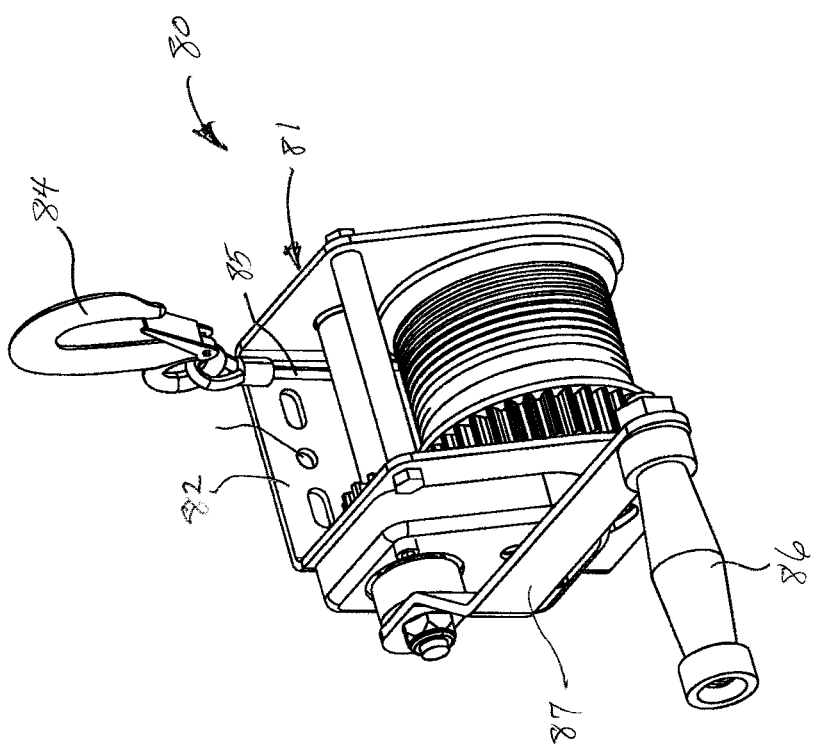
FIG. 20 is a perspective view of a conventional winch.

Any of the embodiments of the present invention may comprise a winch or winch apparatus. In reference to FIGS. 20 through 22, the use of a winch with the kayak rack can be seen. The winch is used for pulling, hauling, and/or lifting a kayak onto the kayak rack. FIG. 20 illustrates a conventional, manual winch 80 having a frame 81, rear plate 82, a hook 84, a cable 85 (or rope or other type of line), and a handle 86 on crank 87. The rear plate 82 is the rear section of the winch 80. The rear plate 82 may be utilized as a mechanism to mount the winch 80 to the front surface of a truck bed 31. A winch 80 may be mounted directly to the vehicle or to the rack. For removability, portability, and convenience of operation, a winch may advantageously be mounted on a special winch plate 90 as shown in the winch apparatus of FIGS. 21 and 22.

Figure 21:
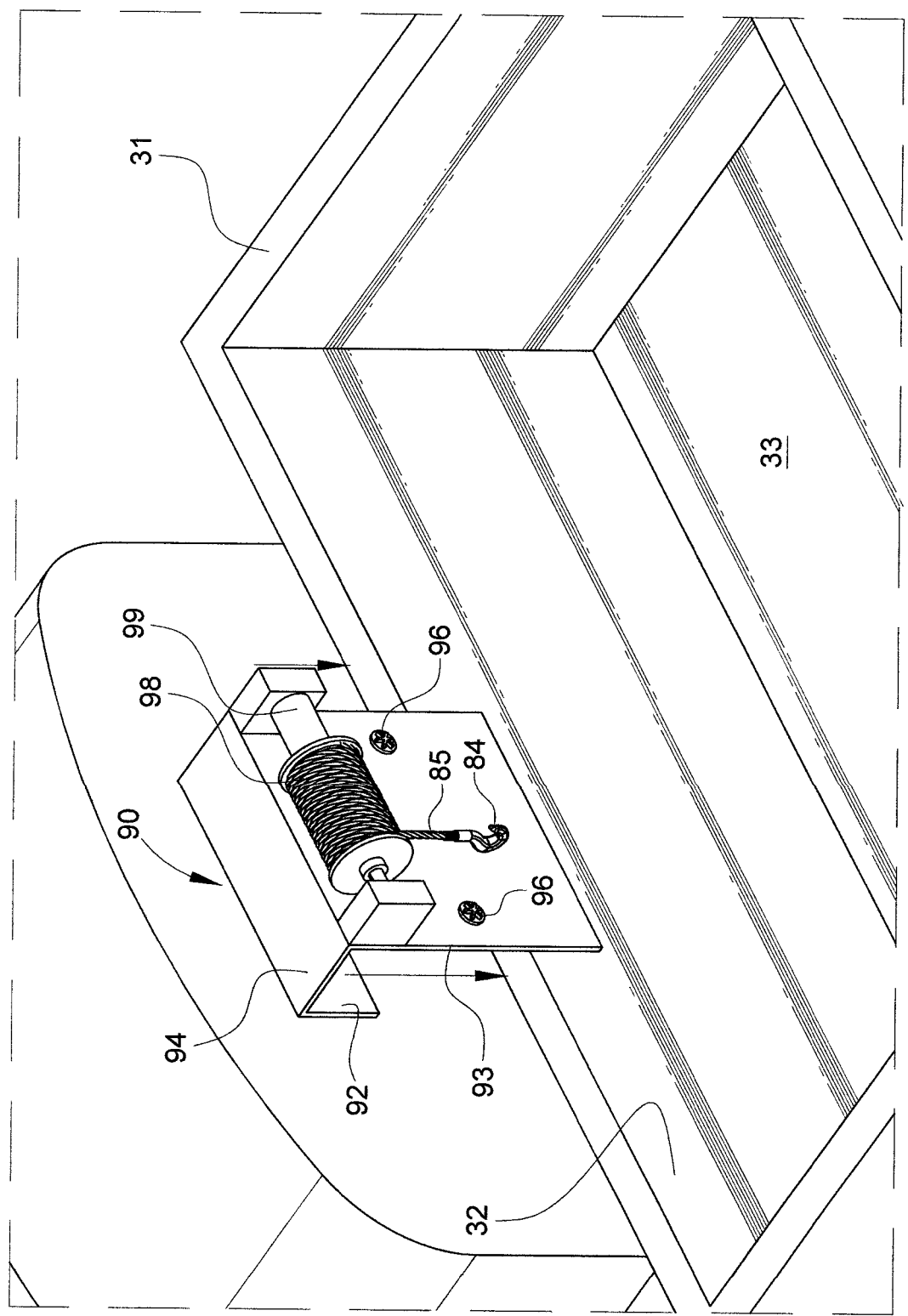
FIG. 21 is an illustration of the winch apparatus according to the invention on a truck bed.
Figure 22:
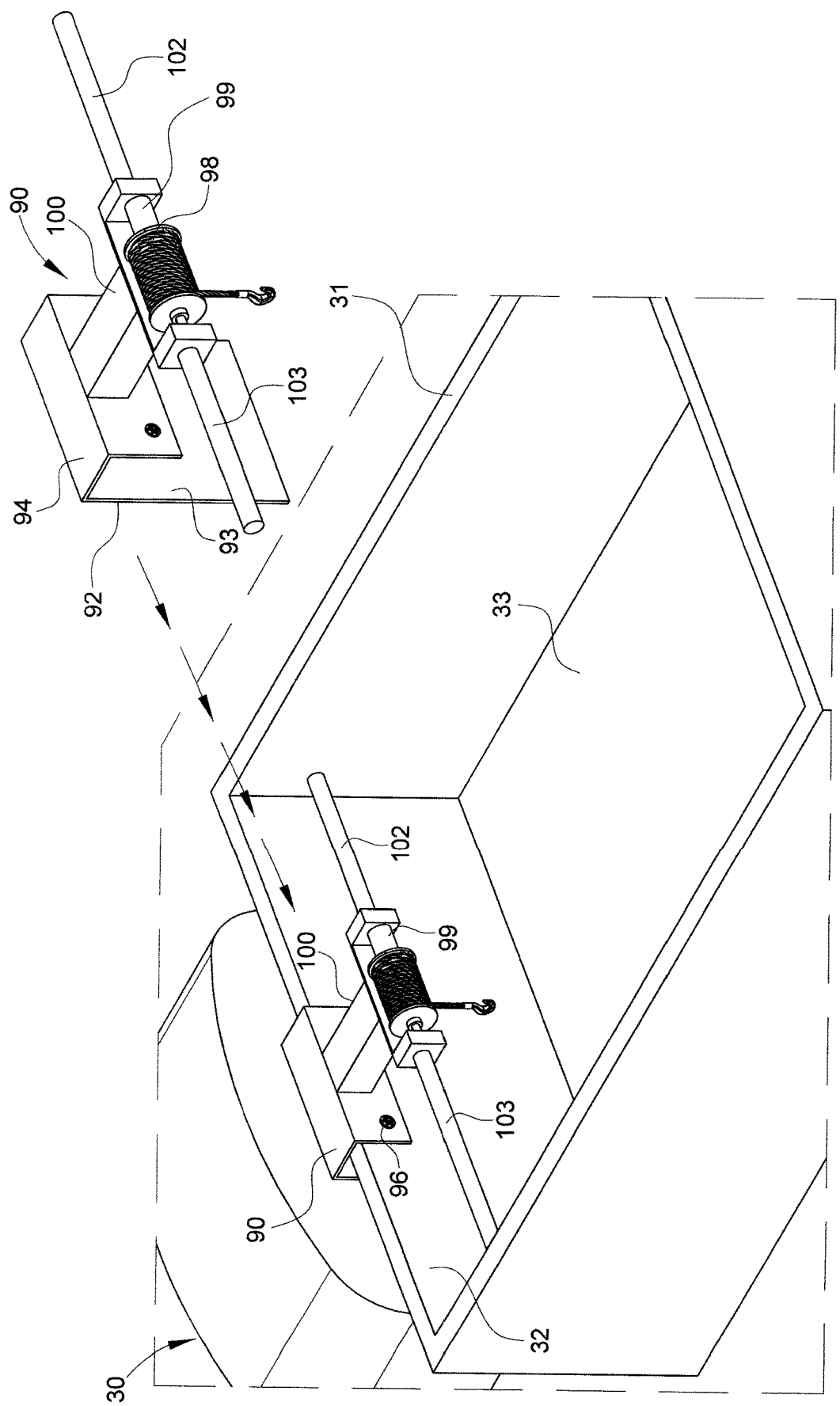
FIG. 22 is an illustration of another winch apparatus embodiment on a truck bed.

As can be seen in FIGS. 21 and 22, in embodiments of the invention the winch plate 90 may define an inverted U-shape with two legs 92, 93 and connecting part 94. Front leg 92 is adapted to slide down between a truck cab and the front wall 32 of the truck bed 31. Rear leg 93 and connecting part 94 are adapted to slide over the front wall 32 of the truck bed 31. Winch plate 90 may include fasteners to affix it to the front wall 32 of the truck bed 31 without having to drill holes in the wall. FIGS. 21 and 22 show knobs 96 which may be used to turn lead screws that grip the front wall 32 and hold the winch plate 90 in place. FIGS. 21 and 22 include winch 98 which has a frame, a rear plate, a hook 84, a cable 85, and a drive 99. Winch 98 may be mounted on winch plate 90.

The set of knobs 96 are used as a mechanism to assist the winch plate to mount against a truck bed. The set of knobs are located on the winch plate. The set of knobs 96 can be adjusted and tightened down to secure the winch plate onto the rail or side of a truck bed. The cable 85 is a lengthy rope-like material used to assist leverage when placing a kayak onto the kayak rack. The hook 84 is a curved or bent fastening device used for holding and securing an object to the cable. The drive 99 may be used as a mechanism to leverage and pull the cable onto the winch. Instead of a handle drive, the winch could be powered, for example. by an electric motor, hydraulic motor, or the like.

In the winch apparatus embodiment of FIG. 22, there is an extension or arm 100 mounted to the winch plate and to which the winch 98 is mounted so that the winch is spaced away from the winch plate and the wall 32 of the truck bed 31. This arrangement may improve the process of loading a kayak or the like onto the rack from the water by means of the winch by changing the angle and/or position of the pulling force on the hook. Support bar(s) 102, 103 may be utilized to assist in the mounting of the winch onto a truck bed. The support bar(s) 102, 103 may be adjustable in length. The support bar(s) may extend out from the winch 98 or the arm 100 to the interior sides of the truck bed 31. The support bars 102, 103 can telescopically expand to the desired length to support the winch within different sized truck beds. The support bar is used to support, stabilize, and assist the winch and winch plate when the winch is pulling heavy loads.

Figure 23:
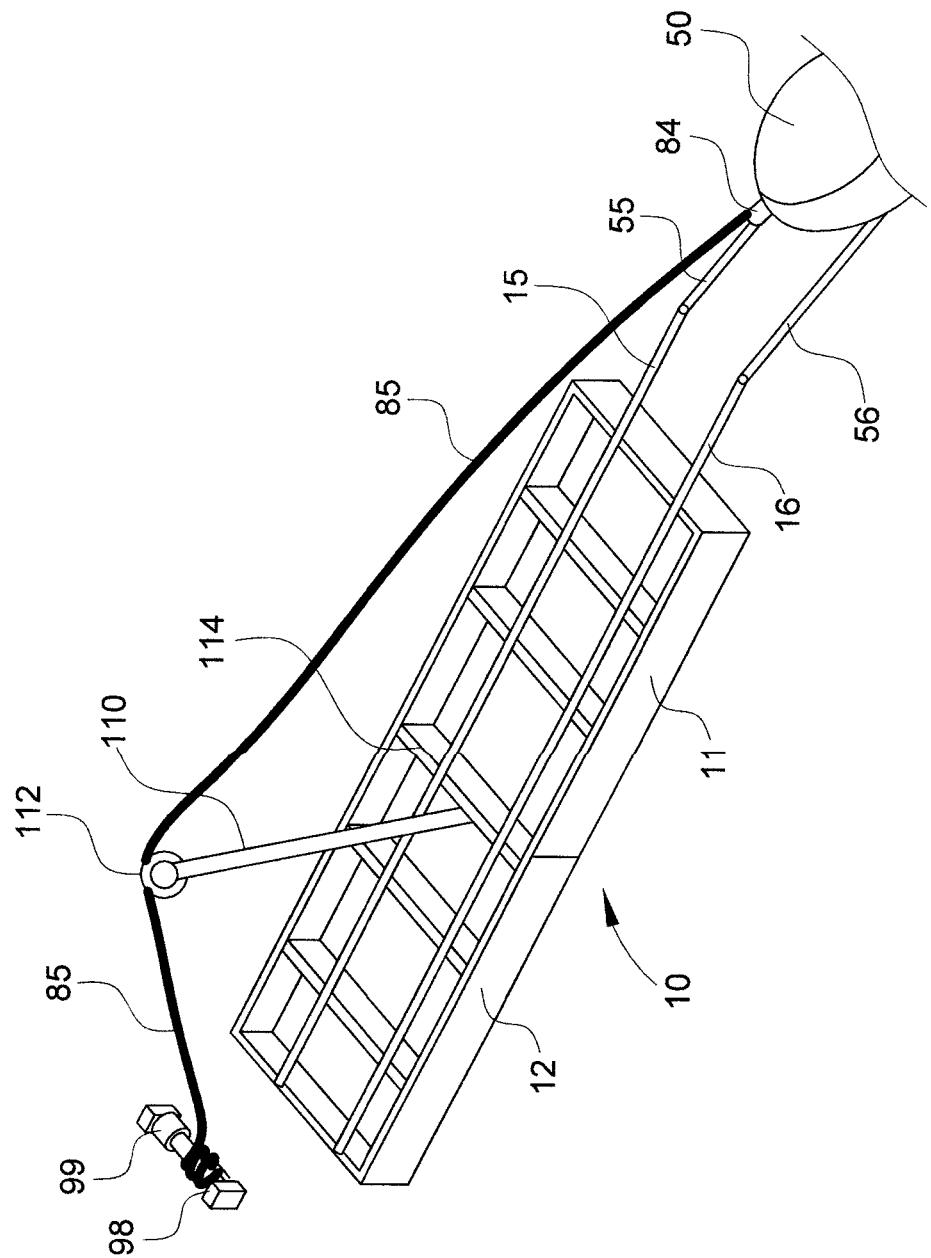
FIG. 23 is an illustration of an extension rod with pulley of the present invention.

In other embodiments illustrated in FIGS. 23 and 24, there may be an extension rod 110 that may be permanently or removably attached to the rack 10 and that may swing on a hinge or mount in a slot in order to adjust the height of an attached pulley wheel 112 and to permit its retraction for storage within the confines of the base of the rack 10 when not in use. In other embodiments, the pulley 112 and attached rod 110 could be detached when not in use. The pulley 112 could be attached to the rack 10 with or without a rod 110. The purpose of the pulley 112 in all embodiments is to assist in the loading and unloading of a kayak or canoe via a rope or cable 85 attached to the kayak or canoe 50. The pulley 112 and rod 110 may also rotate, and/or other pulleys be mounted to the rack or truck, to change the angle of the assisting force depending on where the user is in relation to it. The user could thus be located outside the confines of the vehicle upon which the rack rests or within the confines of the vehicle, such as, for example, in the truck bed as they pull the rope or cable through the pulley. For example, the winch apparatus could be mounted on one side of the truck bed, and there could be more than one pulley or a series of pulleys to further facilitate the loading and unloading of a kayak or canoe, to allow the user to be on the ground beside the truck. Note that the pulley or pulleys and variations in winch mounting can be used in any embodiment of the present invention. The pulley(s) can be used with or without a hand-operated winch 80 or power winch 98 to assist the user with utilizing the present invention. The rod 110 and pulley 112 may be mounted to any of the ribs 13, 14. FIG. 23 shows rod 110 mounted to a central rib 114. FIG. 24 shows rod 110 mounted to a forward rib 116.

When using the extension rod apparatus, as shown in FIG. 23, the user initially pulls the rope or cable 85 that is going through pulley on the winch plate and onto the pulley wheel 112 that is on the extension rod 110 that is fixed at the desired angle to begin to pull the watercraft 50 up the ramp formed by the extension tubes 55, 56, 57 58. When the leading end of the watercraft being loaded onto the rack reaches a certain point, there could a mechanical trigger that releases the extension rod from its fixed upright position and allows it to drop parallel with rack, thus changing the direction of the pulling force from an angle to a more or less straight line. This trigger could occur when the watercraft has travelled far enough up the ramp to be on plane with the truck bed and the rack. The trigger could be rope or cord attached to a release mechanism that the user could pull at the opportune time to release the extension rod and let it fall parallel to the rack.

The winch and extension rod with pulley are just one possible way to assist with pulling a kayak or canoe up onto the rack. Other mechanisms involving for example, a hoist or lift, additional pulleys, block and tackle, screw mechanisms, hand or power driven, or the like may be used with the rack.

Again in reference to FIGS. 23 and 24, the extension rod 110 of the present invention is shown. The extension rod is utilized as a mechanism to assist the leverage and placement of the present invention and a kayak onto a truck bed or trailer. The extension rod 110 may be adjustable with a pulley wheel 112 at the top to compensate for steep angles when loading a kayak. The rod may pivot up and down as shown in FIGS. 23 and 24. In addition, the extension rod could be retracted or fit into a slot to lock in place on the kayak rack when unused.

Figure 25A:
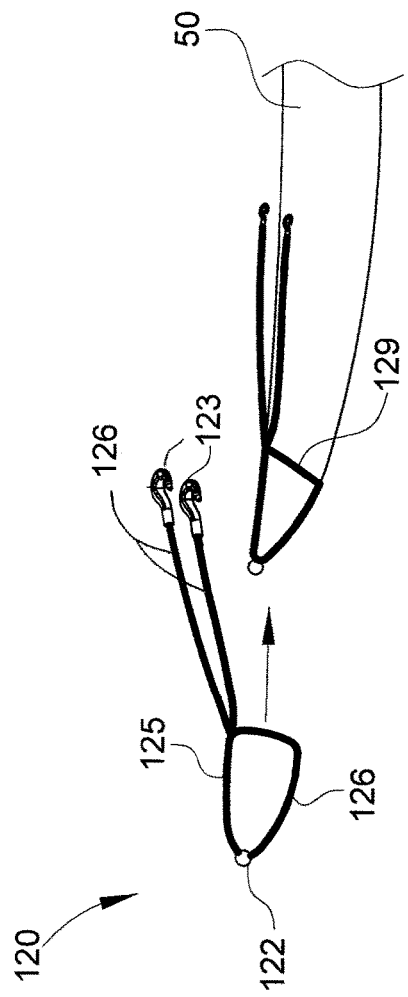
FIG. 25A and 25B illustrate the loop/ring fitting of the present invention.
Figure 25B:
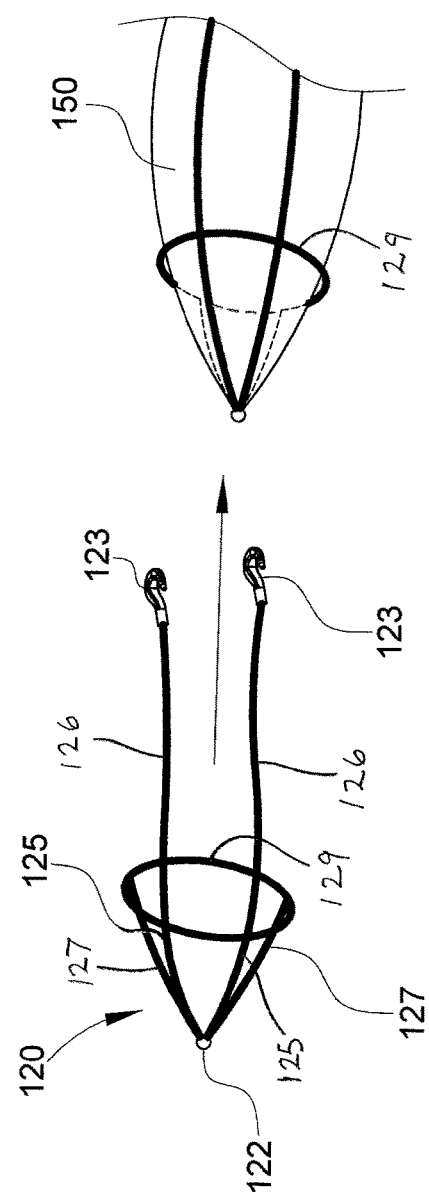

The winch apparatus described above will work best with a watercraft equipped with a bow eye or stern eye or similar component to which the hook can be attached for pulling. Many lighter kayaks do not have a bow eye or stern eye or similar component that is compatible with the typical winch hook. In reference to FIG. 25, a loop/ring fitting 120 is provided for a kayak 50 to which the winch cable or hook may fasten. The loop/ring 122 is the mechanism that is attached to the end of a kayak. The loop/ring fitting 120 has adjustable straps 126 with hooks 123 that tighten down on nearby surfaces, cleats, or mooring rings to secure loop/ring 122 to the kayak as can be seen in FIGS. 25A and 25B. The straps are flexible, strong and may be stretchy or adjustable to be able to fit over the front end of any kayak. In more detail, loop/ring fitting 120 includes top straps 125, bottom straps 127, and connecting straps 129. Top and bottom straps start from loop/ring 122 and spread outward to accommodate the bow of a kayak therein. Connecting straps 129 form a ring around the bow of the kayak to which the spaced out ends of the top and bottom straps are attached. Buckles or other adjustable fittings within each portion of the connecting straps 129 permit the fitting to fit snuggly on any shape or size of kayak bow. Note that FIG. 25 showing the loop/ring fitting attached to a kayak is just one possible embodiment. In other embodiments, the loop/ring could be permanently attached to the kayak via adhesive material, screws, pins, or the like.

The second embodiment could be such that instead of the two sides of the base folding on top of each other via a set of hinges (as in the previously described base ladders 11, 12), the sides could actually slide on top of each other when not in use, making it quick and easy to store or put the entire rack into the truck bed to close the tailgate while out on the lake or just when driving around with the rack in the back. The second ladder 130, i.e., the front half of the rack base that the front of the kayak would rest on (the one that is closest to the winch and rear window of the truck) may have a track, slot, or channel 136, 137 running all or most of the length of the sides 132, 134, near the top, or on the very top of the sides as shown in FIG. 19A. The first ladder 142, i.e., the back/rear half of the rack (the one closest to the tailgate) will then have a rail 146, 147 whose shape corresponds with the shape of the track/channel 136, 137 on the other ladder, allowing the track to fit snugly into the track/channel as shown in FIG. 19B. At storage time the rail 146, 147 of the back/rear half 140 of the rack can be aligned with the channel 136, 137 on the front half 130 of the rack and then pushed to the point where the sides of each side of the base are interlocked, with one on top of the other. There would then be a mechanism such as a latch that secures the bases from detaching via the rail/track system until the user is ready to deploy the rack again for its intended use. In this embodiment, where the sides of the bases are not connected and are two separate pieces, there will be a mechanism located on the exterior side of each base, on the side of the base where the two sides of the base connect in the deployed position. This mechanism will secure/affix the two sides together. This design lends itself to use of metal or plastic extrusions for the sides 132, 134, 142, 144 with the slots 136, 137 and rails 146, 147.

The third embodiment of the present invention, the two bases (the first ladder and the second ladder) can attach in other methods besides a hinge. For example, on the exterior sides of the base could be a metal track running longways. There could be an axle rod a few inches long that has a wheel on each end, with one wheel rolling on the track on one side of the base and the other wheel on the track on the other base. There could be an axle rod with the wheels on the tracks on both sides of the rack. The axle rod could be just long enough to allow the rear side of the rack (the end hanging off the tailgate when the rack is in use) to be lifted and slide over the other side of the base below, along the pipes. There could then be a mechanism to lock the two sides together.

The various embodiments could utilize various tie-downs in order to anchor or secure the rack in place in a truck bed or other vehicle when deployed.

Figure 29:
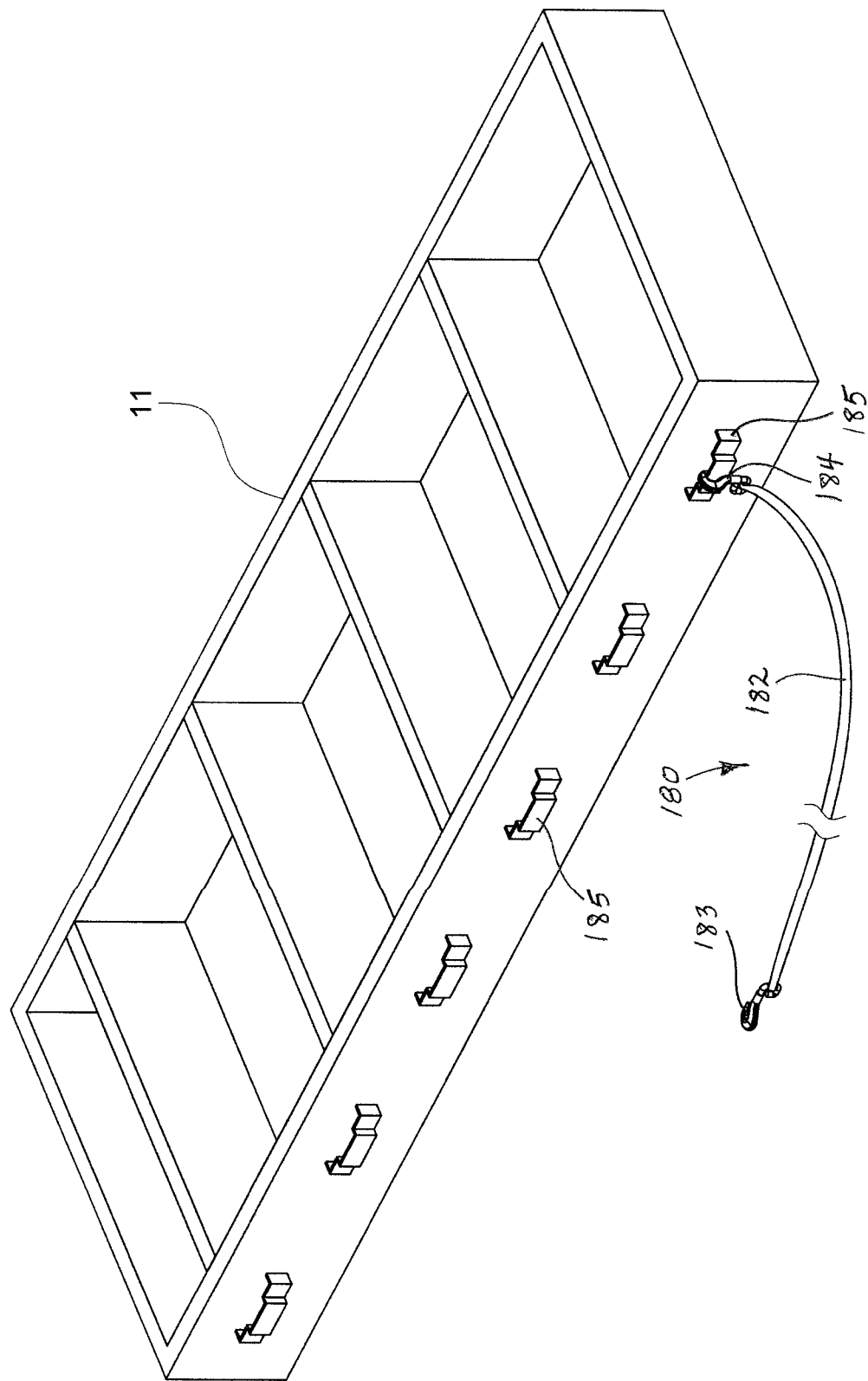
FIG. 29 illustrates a strap with a hook at each end for tying down the rack in the truck or trailer.

For example, the various embodiments could utilize various kinds of braces or supports that secure the rack to the truck or trailer bed and prevent undesirable movement of the rack. The braces could be rods or bars that extend from either side of the rack to the interior side of the truck bed. FIG. 11 illustrates some options. In FIG. 11, bracing rod 47 extends from one side of the rack to one interior side of the truck bed to illustrate a rigid rod option. Bracing rod 48 likewise extends from one side of the rack to a side of the truck bed to illustrate a telescoping or adjustable bracing rod. Bracing chain 46 illustrates a chain 46 extending from a tie down loop on the truck to the rack as another option. Thus, the braces or supports could be adjustable in length and could include straps, chains, hooks, clamps, rods, beams, and the like, and may be attached with joints, fittings, couplings, universal joints, wire lock pins, cotter pins, hinges or the like on either side of the truck bed and rack for the purpose of securing the rack in the bed of the truck. FIG. 29 illustrates a strap assembly 180 with a hook 183,184 at each end of strap 182 for securing the rack in the truck or trailer. On or more anchor loops 185, or cleats, eyelets, rings, or the like may be included at any convenient position along a rack portion (such as ladder 11) to which the strap or other tie-down may be affixed.

Figure 30:
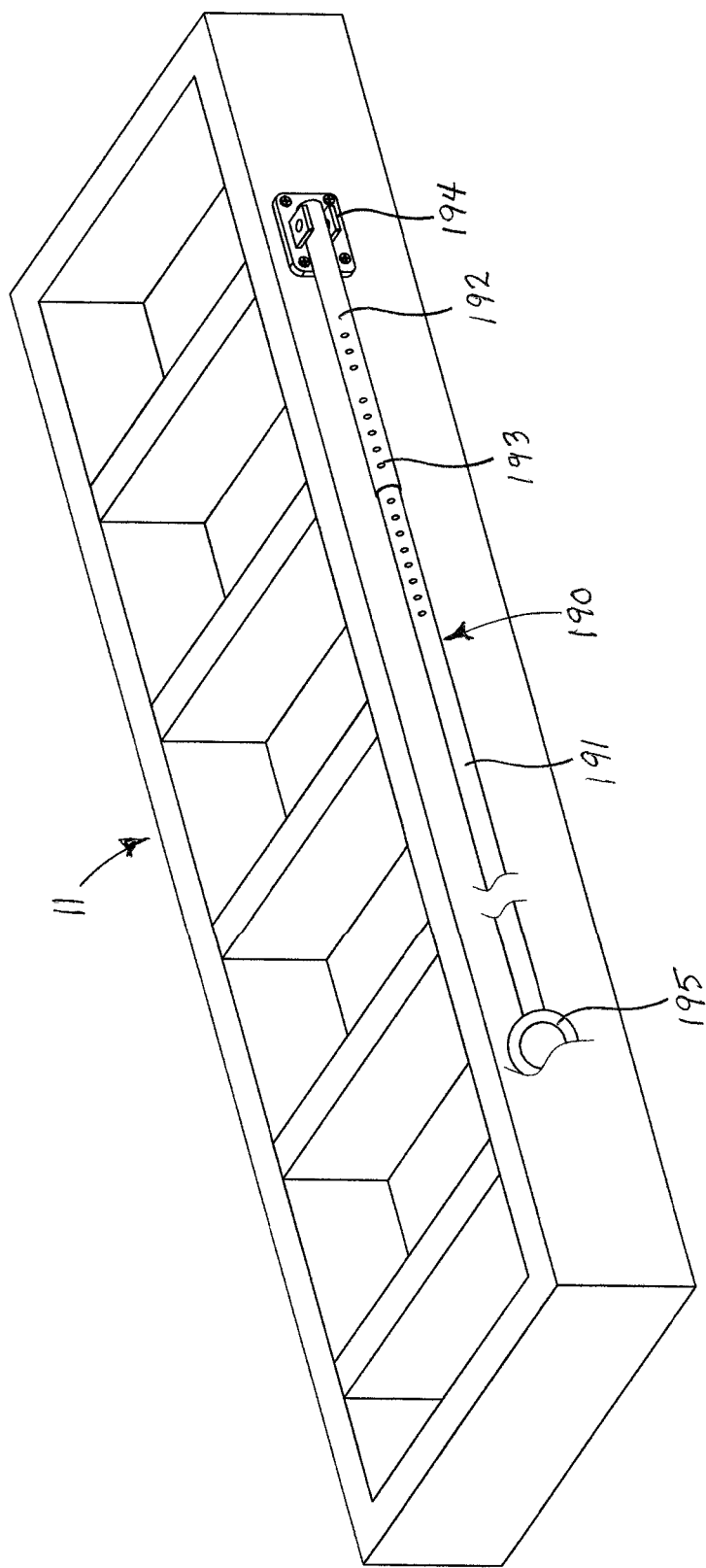
FIG. 30 illustrates a tie-down or stabilizing rod on one side of the rack.

FIG. 30 illustrates an alternate type of tie-down in the form of an extendable bracing rod 190 mounted on one side of rack 11. The bracing rod 190 may include two cylinders 191, 192, one smaller one (191) going into a larger one (192), making it adjustable in length, using for example holes 193 that line up with a pin going through them. One end of the rod 190 may be attached to the side of the rack at or near the middle of the rack with a bracket 194 of some sort. At the other end of the bracing rod is a hook or claw type mechanism 195 with perhaps a strap to go all the way around an object used to attach the end of the rod to. The bracing rod 190 may be permanently attached on one end to the bracket 194 but has the ability to swing out from the side of the rack 11 to be in a perpendicular position to the rack when deployed to anchor or brace to an object like the side of a truck bed.

Figure 26:
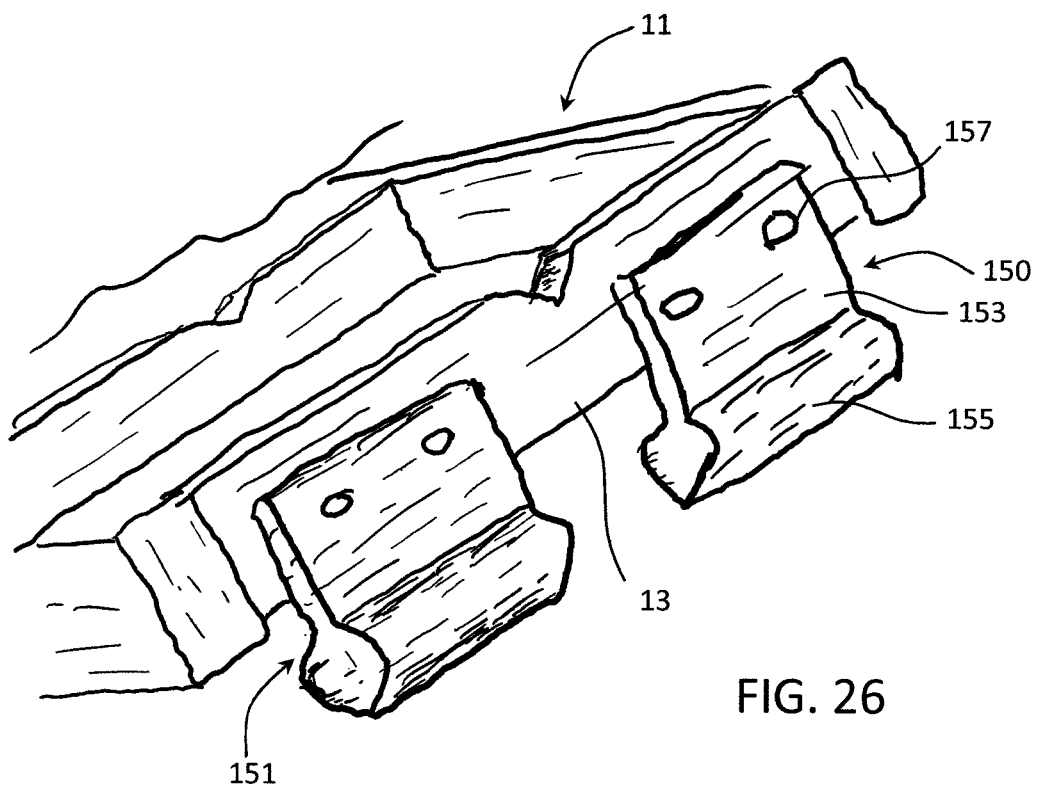
FIG. 26 illustrates one embodiment of a downward extension.

Any of the embodiments could utilize downward extensions or pins made of sturdy, perhaps flexible material that attach to the rib or portion of the rack nearest the tailgate of the truck, such as the rear of rack, and protrude downward to extend or wedge into the gap between an open tailgate and the truck bed. This material could be flexible enough to fill up the space to restrict movement within the gap, yet sturdy enough to prevent movement. The width and number of extensions may vary, as well as the shape. Whatever the material used for the extension(s), it could take on any shape; it would not have to be pin-shaped. FIG. 26 illustrates use of two extensions 150, 151 mounted on rib 13 of rear ladder 11 with fasteners 157. These extensions include flat mounting plate portion 153 and thicker wedging portion 155 which may fit snugly between the truck bed and the open tailgate.

Figure 27:
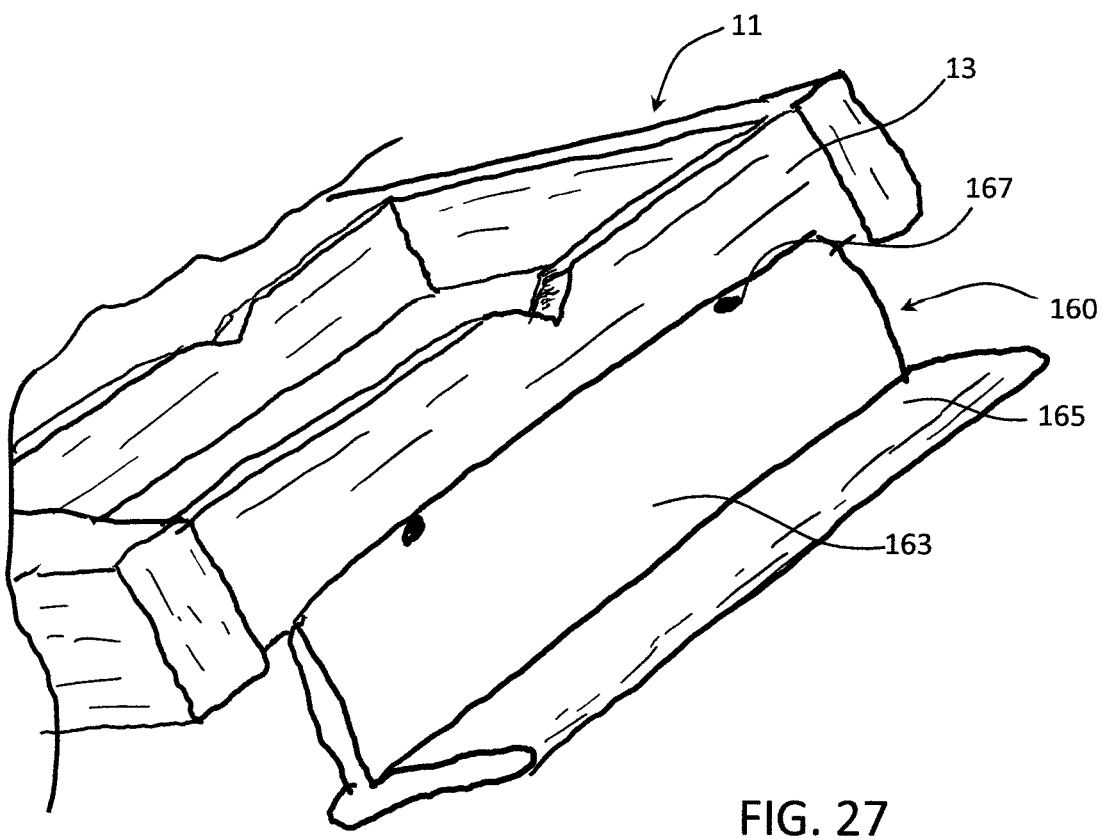
FIG. 27 illustrates another embodiment of a downward extension.

FIG. 27 illustrates the use of a single, wider extension 160 mounted on rib 13 of rear ladder 11 with fasteners 167. This extension 160 includes flat mounting plate portion 163 and thicker L- or T-shaped portion 165 which may fit between the truck bed and the open tailgate and extend under the open tailgate to prevent upward movement. The width and number of L- or T-shaped extensions could vary as needed. Note that the T-shape is really an upside-down T in FIG. 27.

Figure 28:
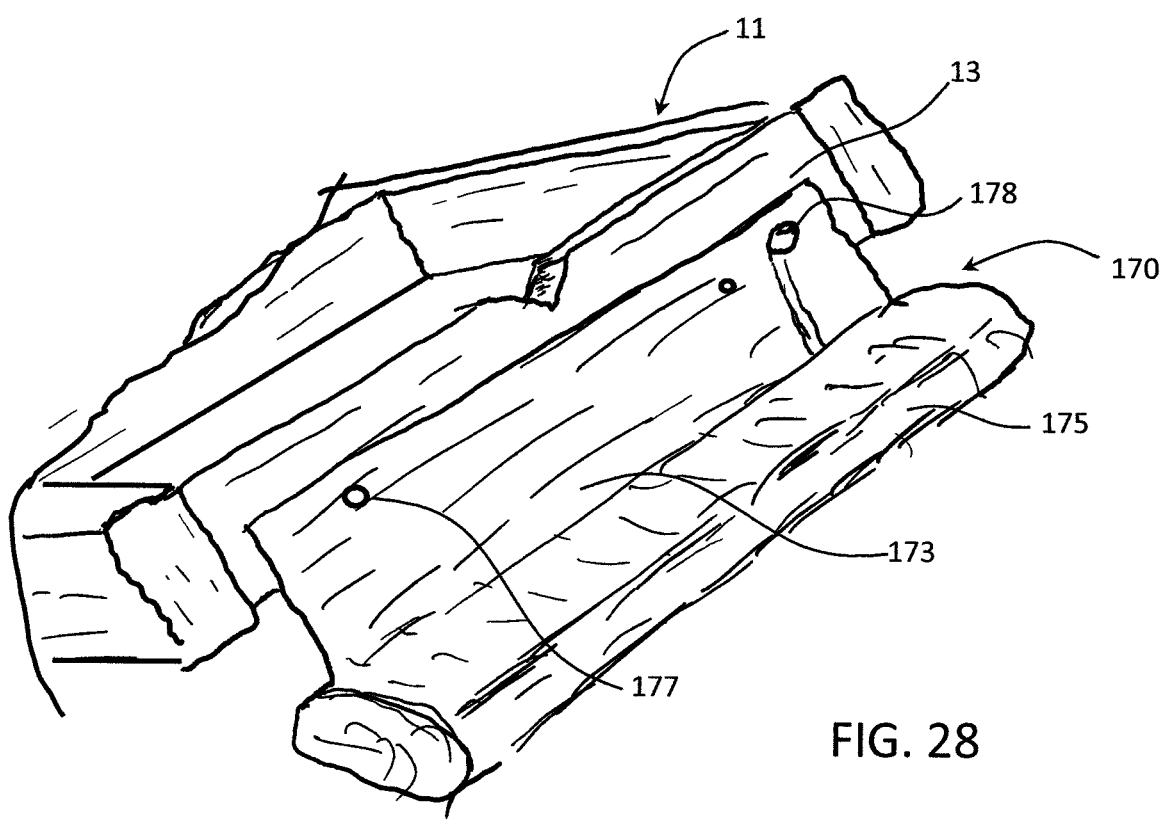
FIG. 28 illustrates yet another embodiment of a downward extension.

FIG. 28 illustrates use of an air bladder type extension 170 that could attach to the rack 11 somewhere in the middle or near the middle or at the end, for example to rib 13 utilizing a flat mounting portion 173 and fasteners 177. The air bladder 175 in its deflated state would slide down in between the rear of the truck bed and the bottom of the tailgate (when tailgate is open). The air bladder 175 would then be inflated using air nozzle 158. Bladder 175 would be inflated to the point where: (1) it will prevent the air bladder from being able to come up through the opening and (2) it will stabilize the rack by providing enough air for the weight of the tailgate, rack, and kayak to displace/spread out. This effect will be like blowing up a balloon and pressing on it, making it flattened instead of round. The various extensions shown in FIGS. 26-28 could be made easily detachable from the rack by using suitable fasteners.

In the embodiment where the ribs on the rack go all the way across from one side of the base to the other, there are notches in the middle of the ribs to accommodate the bottom of the hull of the kayak. One important note is that the notch on one or more ribs, and especially the rib at the very rear of the rack (the end of the base on top of the tailgate when rack is deployed) may be lined with metal, composite, or a self-lubricating plastic or another material to protect against damage from the friction/rubbing of the cable/rope as it is pulling a kayak up the ramp. Furthermore, in another embodiment of the present invention, one or more of the ribs may be gapped in areas of the triangular crevices. Meaning that these ribs do not fully connect across the ladder-like structure as there are gaps in the center. In another embodiment, one or more of the ribs would attach to both sides of the rack at or near the bottom of the rib, but the top and middle portion of the rib would be cut-out to leave space for the bottom of the canoe/kayak. These gaps would leave an empty space in the middle of the rack for the keel of the kayak.

Any embodiment of this device could also include an apparatus to enable the rack and possibly the kayak to be locked in the truck bed to prevent theft.

To use the present invention, the present invention will be mounted on the rear bed of a truck. When preparing to load a kayak in the bed of a truck, the tailgate on the truck would be opened and the rack retrieved and placed in the truck bed. The rack would then be unfolded or detached (depending on the embodiment), with the appropriate side of the rack being placed towards the cab of the truck and the other towards the rear of the truck bed or tailgate. In the embodiment that utilizes hinges to attach the ladders together, when loading/ unloading the kayak it can be advantageous to not secure the rack in such a way that holds it down tightly on the truck bed. It may be advantageous to allow the rear ladder nearest to the tailgate to bow or raise upward when the weight of the kayak is located on the extendable tubes or rear ladder of the rack. The resulting tilt of the rack may assist in the loading/ unloading of the kayak. In the embodiment utilizing the rail/track system, the two bases would then be secured together via whatever locking or latching or fastening mechanism is used for this purpose. The rods that extend from the sides of the rack to the interior sides of the truck bed would then be deployed and fastened to secure the rack in the truck bed. Any additional securing methods (i.e., rods, straps, air bladder, or pins) would also be deployed at this point in addition to/in lieu of the bracing rods extending to the side of the truck bed. The winch apparatus and winch plate would be secured onto the rim/edge of the truck bed or, in other embodiments, secured/anchored in any necessary way. In embodiments that comprise them, the bumping blocks or "padded brackets" (whether they are on the winch plate or on the rack itself) would then be placed in their appropriate position. The extendable tubes used to load and unload the kayak would then be retrieved and attached to the appointed place on the rack, then extended to their deployed position to receive the kayak. The winch cable or rope and the attached fastening mechanism (hook, carabiner, latch, knot, or the like) would be retrieved and pulled off the reel of the winch to a length long enough to hook/attach to the kayak. The cable would then be straightened/positioned to the middle of the rack in order to line up the winch, cable/rope, and kayak so that the kayak can be pulled straight up the expandable tubes or "ramps" and onto the rack. The winch is then engaged to pull the kayak onto the rack, stopping the kayak when it reaches the bumping blocks/padded bracket or anywhere the user chooses. In embodiments that utilize one or more pulley(s), in lieu of using the winch, the user could thread the rope/cable through the pulley(s) and use the same procedure as above to assist in the loading and unloading of the kayak/canoe. Also, if the user so chooses, the user could simply use the rope/cable to move the kayak up and down the ramps with no assistance from winch, pulley, etc. The extendable tubes would then be retracted and stored in their proper place. The straps and/or any other method/means of securing the kayak on the rack and inside the truck bed would then be attached and tightened, thus making the kayak safe and secure for transport.

To unload the canoe or kayak from the present invention, the user will do the following procedures. When user is ready to unload kayak/canoe, simply deploy the extendable tubes. Detach and remove any straps or other securing measures holding the kayak/canoe on the rack and/or on the truck. Ensure that the hook/latch/clip etc. that is attached to the rope or cable connected to the winch or pulley, or just a free-standing rope, is securely attached to the kayak/canoe to prevent it from "getting away" from the user after traveling down the extendable tubes and into the water. The kayak/ canoe would then be pushed or otherwise moved off the rack and down the extendable tubes. After securing the kayak/ canoe in the water to be ready for use, the extendable tubes would be detached and/or retracted and set aside or placed in a designated compartment on the rack. The rack could then be unhooked from the vehicle and folded up if desired. Folding may be desirable to enable the tailgate to be closed.

Note that the present invention may be modified to accommodate multiple kayaks/canoes at once and is not intended to be limited by accommodating, holding, and securing a single kayak/canoe.

The rack may be constructed in many possible ways, with a variety of materials. A prototype was constructed in roughly the shape and proportions of rack 10 in FIG. 1. The prototype was constructed with common lumber for the ladders, PVC pipe for the pipes and extendible tubes, and various common hinges, screws and other fasteners. The rack was chained to the truck bed but allowed to pivot, tilt or raise upward as a kayak was loaded onto it or unloaded. Other materials could be used, such as plastic, composites, aluminum, or other metals. Floats could be foam materials such as polyethylene, polystyrene, polyurethane or the like, and may be covered with plastic or cloth or other impervious material.

Although the invention has been explained in relation to its preferred embodiment, it is to be understood that many other possible modifications and variations can be made without departing from the scope of the invention.

The invention claimed is:

1. A rack suitable for loading and offloading a kayak or other small watercraft on the bed of a pickup truck, trailer or other vehicle comprising: a first ladder comprising two sides, two or more ribs connecting the two sides, and two pipes mounted on the ribs and running lengthwise with respect to the first ladder; a second ladder comprising two sides, two or more ribs connecting the two sides, and two pipes mounted on the ribs and running lengthwise with respect to the second ladder; and two extension tubes mountable parallel to each other to extend the two pipes on the first ladder away from the rack.

2. The rack of claim 1 further comprising one or more straps connecting to and maintaining the spacing between the two extension tubes.

3. The rack of claim 2 wherein the two extension tubes each comprise two or more sections which can be collapsed for storage or extended for use.

4. The rack of claim 3 wherein the two extension tubes each comprise one or more support rods extending out from the extension tube.

5. The rack of claim 4 wherein at least one of the one or more support rods further comprises a roller.

6. The rack of claim 4 wherein the one or more support rods are each adapted to collapse into a corresponding cavity in the corresponding extension tube.

7. The rack of claim 6 wherein the two or more sections comprise a smaller diameter section which can telescope into a larger diameter section; and wherein the support rods reside on the smaller diameter section and do not interfere with the telescoping into the larger diameter section.

8. The rack of claim 1 further comprising: one or more hinges connecting the first ladder and the second ladder in end-to-end fashion and adapted so the first ladder and the second ladder can be folded to lay one on top of the other.

9. The rack of claim 1 wherein the pipes are curved.

10. The rack of claim 1 further comprising: one or more pillars attached to the front end of the second ladder to extend the second ladder to a predetermined length.

11. The rack of claim 10 wherein the one or more pillars are hinged to the second ladder for folding for compact storage.

12. The rack of claim 1 wherein the first ladder and the second ladder comprise mating lengthwise profiles on the sides enabling the first ladder and the second ladder to slide together in a stacked arrangement.

13. The rack of claim 1 wherein the two extension tubes connect directly to the ends of the two pipes on the first ladder.

14. The rack of claim 1 wherein the two extension tubes connect to two respective ports mounted on respective sides of the two pipes on the first ladder.

15. The rack of claim 14 wherein the ends of the two pipes on the first ladder protrude beyond the length of the first ladder and are rounded.

16. The rack of claim 1 further comprising an extension rod having a pulley mounted thereon.

17. The rack of claim 1 wherein the ribs comprise multiple attachment points for the pipes enabling the pipes to have lengthwise curvature.

18. The rack of claim 1 further comprising one or more padded brackets.

19. The rack of claim 1 further comprising one or more tie-downs.

20. A rack system comprising: the rack of claim 1; a winch mounted on a winch plate, the winch plate mountable on a wall of a bed of a pickup truck; and a tie-down adapted to secure the rack to the bed of the pickup truck.

21. The rack system of claim 20 wherein the winch plate is shaped like an inverted U or J for straddling the wall; the winch plate further comprising knobs to secure the plate to the wall.

22. The rack system of claim 20 wherein the tie-down comprises a strap, a chain, a bracing rod, or an extendable rod.

23. The rack system of claim 20 wherein the winch comprises a line and a hook; and the system further comprises a loop/ring apparatus which comprises: an eye compatible with the hook, and straps adapted to attach the eye to the end of a kayak for towing the kayak with the winch.

* * * * *